(12) United States Patent
Duval et al.

(10) Patent No.: US 10,182,455 B2
(45) Date of Patent: Jan. 15, 2019

(54) DEVICE TO-DEVICE WIRELESS COMMUNICATION

(71) Applicant: FUJITSU CONNECTED TECHNOLOGIES LIMITED, Kawasaki-shi, Kanagawa (JP)

(72) Inventors: Olivier Duval, Santa Clara, CA (US); Akira Ito, San Jose, CA (US)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 9 days.

(21) Appl. No.: 15/309,779

(22) PCT Filed: May 8, 2014

(86) PCT No.: PCT/US2014/037350
§ 371 (c)(1),
(2) Date: Nov. 8, 2016

(87) PCT Pub. No.: WO2015/171153
PCT Pub. Date: Nov. 12, 2015

(65) Prior Publication Data
US 2017/0150527 A1    May 25, 2017

(51) Int. Cl.
*H04W 4/00* (2018.01)
*H04W 74/08* (2009.01)
(Continued)

(52) U.S. Cl.
CPC ....... *H04W 74/0816* (2013.01); *H04W 8/005* (2013.01); *H04W 72/04* (2013.01); *H04W 4/70* (2018.02); *H04W 84/18* (2013.01)

(58) Field of Classification Search
CPC .. H04W 74/0816; H04W 72/04; H04W 8/005
See application file for complete search history.

(56) References Cited

U.S. PATENT DOCUMENTS

| 8,341,293 B2 | 12/2012 | Ahn et al. |
| 9,232,460 B2 | 1/2016 | Zhu et al. |

(Continued)

FOREIGN PATENT DOCUMENTS

WO    2013169974 A1    11/2013

OTHER PUBLICATIONS

Hung, Sheu, Hsu, Scheduling of Broadcasts in Multihop Wireless networks, Ad Hod & Sensor Wireless Networks, 2003, 7p.
(Continued)

*Primary Examiner* — Clemence S Han
(74) *Attorney, Agent, or Firm* — Maschoff Brennan

(57) ABSTRACT

A method includes obtaining a first packet at a first wireless device from a second wireless device. The second wireless device may be a neighboring wireless device of the first wireless device. The method may also include transmitting a second packet to a third wireless device that is a neighboring wireless device of the first wireless device. The method may also include obtaining a third packet from the third wireless device in response to transmitting the second packet to the third wireless device and obtaining a fourth packet from the third wireless device in response to the third wireless device receiving a fifth packet from a fourth wireless device that is not one of the multiple neighboring wireless devices of the first wireless device. The fourth packet may indicate reserved radio resources for future packet transmissions from the first wireless device to the third wireless device.

20 Claims, 9 Drawing Sheets

(51) Int. Cl.
*H04W 8/00* (2009.01)
*H04W 72/04* (2009.01)
*H04W 4/70* (2018.01)
*H04W 84/18* (2009.01)

(56) References Cited

U.S. PATENT DOCUMENTS

| | | |
|---|---|---|
| 9,301,160 B2 | 3/2016 | Zhu et al. |
| 9,414,379 B2 | 8/2016 | Zhu et al. |
| 2009/0016272 A1* | 1/2009 | Li .................. H04L 1/0002 370/328 |
| 2012/0028672 A1 | 2/2012 | Chen et al. |
| 2013/0308549 A1* | 11/2013 | Madan ................ H04W 28/26 370/329 |
| 2014/0192735 A1* | 7/2014 | Sridharan ............. H04W 8/26 370/329 |
| 2014/0274192 A1 | 9/2014 | Zhu et al. |
| 2015/0098382 A1 | 4/2015 | Duval et al. |
| 2015/0127733 A1* | 5/2015 | Ding .................. H04W 4/08 709/204 |

OTHER PUBLICATIONS

R1-134238, "D2D Scheduling Procedure", Ericsson, 3GPP-RAN WG2#84, San Francisco, USA, Nov. 11, 2013.
802.11-2012—IEEE Standard "Wireless LAN Medium Access Control (MAC) and Physical Layer (PHY) Specifications" Jul. 15, 2010.

* cited by examiner

DEVICE TO-DEVICE WIRELESS COMMUNICATION

FIELD

The present disclosure relates to device-to-device wireless communication.

BACKGROUND

The proliferation of smartphones, tablets, laptop computers, and other electronic devices (referred to generally as "wireless devices") that use wireless communication networks has created an increased demand for continuous wireless voice and data access. It is becoming increasingly attractive to use wireless devices in a wireless communication network as relaying points to provide the continuous wireless access to wireless devices.

The subject matter claimed herein is not limited to embodiments that solve any disadvantages or that operate only in environments such as those described above. Rather, this background is only generated to illustrate one example technology area where some embodiments described herein may be practiced.

SUMMARY

According to an aspect of an embodiment, a method includes obtaining a first packet at a first wireless device from a second wireless device in a wireless communication network. The second wireless device may be one of multiple neighboring wireless devices of the first wireless device. The method may also include transmitting a second packet from the first wireless device to a third wireless device that is one of the multiple neighboring wireless devices. The method may also include obtaining a third packet at the first wireless device from the third wireless device in response to transmitting the second packet to the third wireless device and obtaining a fourth packet at the first wireless device from the third wireless device in response to the third wireless device receiving a fifth packet from a fourth wireless device that is not one of the multiple neighboring wireless devices of the first wireless device. The fourth packet may indicate reserved radio resources for future packet transmissions from the first wireless device to the third wireless device.

The object and advantages of the embodiments will be realized and achieved at least by the elements, features, and combinations particularly pointed out in the claims. It is to be understood that both the foregoing general description and the following detailed description are exemplary and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

According to an aspect of an embodiment, a wireless communication network including multiple wireless devices may be configured to enable device-to-device (D2D) communication between the wireless devices to facilitate broadcasting message data, such as voice data, to all of the multiple wireless devices in the wireless communication network.

Before distributing message data, the wireless devices may perform a control sequence to determine wireless devices where potential wireless transmission collisions may occur. When a particular wireless device determines that potential wireless transmission collisions may occur at the particular wireless device, the particular wireless device may reserve radio resources for future transmissions by other wireless devices to the particular wireless device. The particular wireless device may inform neighboring wireless devices of the reserved radio resources so that the neighboring wireless devices may transmit future message data to the particular wireless device using the reserved radio resource. As a result, a number of transmission collisions that may occur during the D2D communications between the wireless devices may be reduced.

Embodiments of the present disclosure will now be explained with reference to the accompanying drawings.

Figure 1:
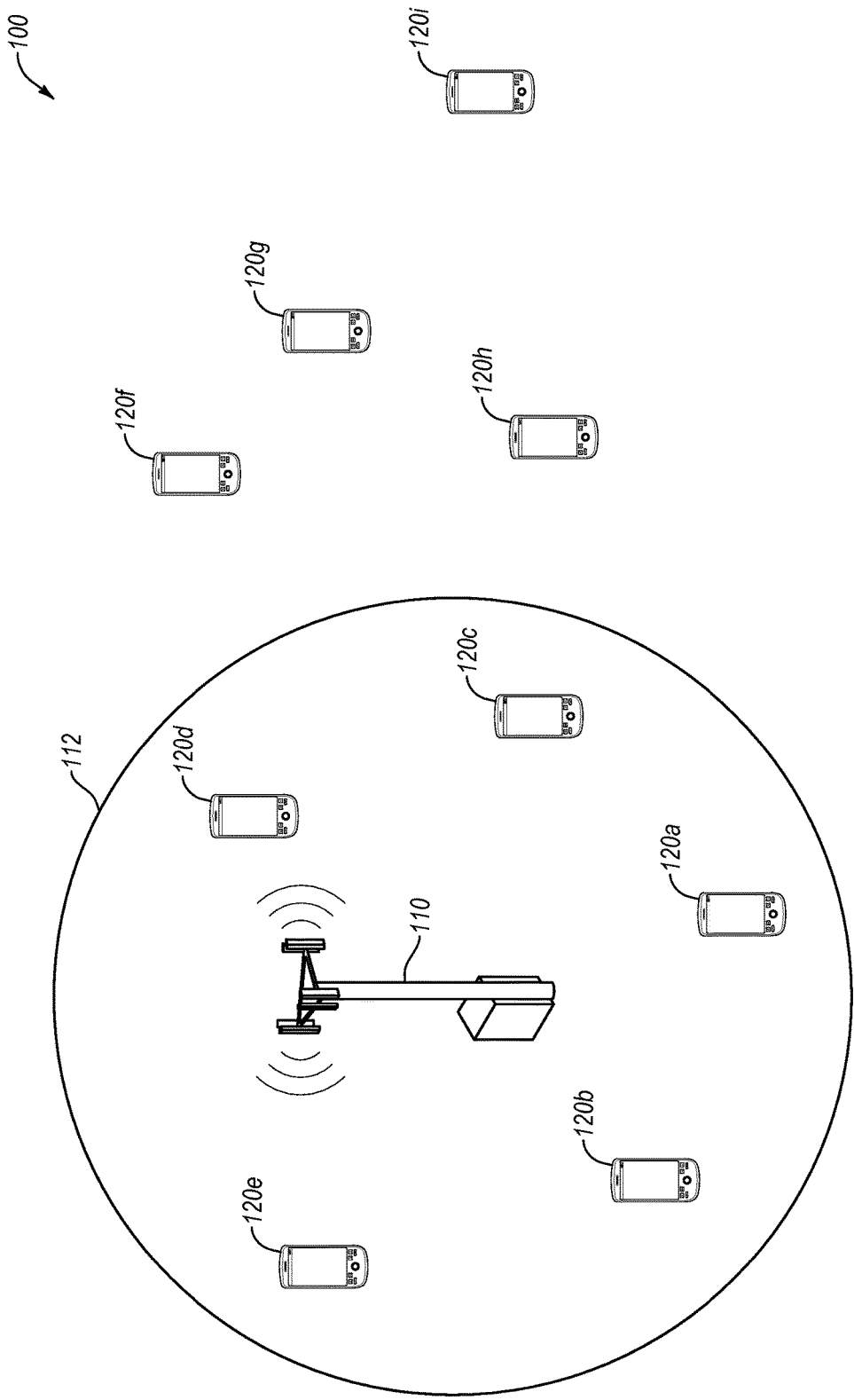
FIG. 1 illustrates an example wireless communication network.

FIG. 1 illustrates an example wireless communication network 100 (referred to hereinafter as "network 100"), arranged in accordance with at least one embodiment of the present disclosure. The network 100 may be configured to provide wireless communication services to one or more wireless devices 120. In some embodiments, some of the wireless communication services may be supervised by one or more access points 110. Alternately or additionally, some of the wireless communication services may be supervised by the wireless devices 120. For example, some device-to-device (D2D) communications between the wireless devices 120 may be supervised by the wireless devices 120 without supervision by the access point 110.

The wireless communication services may be voice services, data services, message services and/or any suitable combination thereof. The network 100 may include a Frequency Division Multiple Access (FDMA) network, an Orthogonal FDMA (OFDMA) network, a Code Division Multiple Access (CDMA) network, a Time Division Multiple Access (TDMA) network, a Single-Carrier Frequency-Division Multiple Access (SC-FDMA), and/or any other suitable wireless communication network. In some embodiments, the network 100 may be configured as a third generation (3G) wireless communication network and/or a fourth generation (4G) wireless communication network. In these or other embodiments, the network 100 may be configured as a long-term evolution (LTE) wireless communication network and/or as an LTE-advanced (LTE-A) wireless communication network.

The access point 110 may be any suitable wireless communication network communication point and may include, by way of example but not limitation, a base station, an evolved node "B" (eNB) base station, a remote radio head (RRH), a LTE smart cell, or any other suitable communication point. The wireless devices 120 may include any devices that may use the network 100 for obtaining wireless communication services and may include, by way of example and not limitation, a cellular phone, a smartphone, a personal data assistant (PDA), a laptop computer, a personal computer, a tablet computer, or any other similar device.

In some embodiments, as illustrated, the wireless devices 120a-120e may be within an area, referred to as a cell 112, that is serviced by the access point 110 such that the access point 110 may be configured to wirelessly communicate directly with the wireless devices 120a-120e. The wireless devices 120f-120i may be outside the cell 112. As a result, the wireless devices 120f-120i may not have direct wireless communication with the access point 110. In some embodiments, the access point 110 may be able to communicate with the wireless devices 120f-120i by relaying communications through one or more of the wireless devices 120 using D2D communications. In some embodiments, all of the wireless devices 120 in the network 100 may be within the cell 112 or within a cell that allows the wireless devices 120 to communicate with the access point 110 or another access point. Alternately or additionally, the wireless devices 120 may be located such that none of the wireless devices 120 may be able to communicate with an access point. In these embodiments, the wireless devices 120 may communicate with each other using D2D communications. In these and other embodiments, the wireless devices 120 may be the only devices in the network 100.

To perform D2D communications within the network 100, the wireless devices 120 may first discover the wireless devices 120 within the network 100 with which the wireless devices 120 may directly wirelessly communicate. The wireless devices 120 with which the wireless devices 120 may communicate may be considered the neighbors of the wireless devices 120. For example, the wireless device 120a may have wireless devices 120b and 120e as neighbors where wireless devices 120d-120i may be positioned such that they are not neighbors of the wireless device 120a. In some embodiments, the wireless devices 120 may keep a list of their neighbors and periodically update the list of their neighbors.

The wireless devices 120 may determine their neighboring wireless devices 120 using various types of discovery signals, such as described in U.S. patent application Ser. No. 13/828,457 by Zhu et al., filed on Mar. 14, 2013 and entitled "NETWORK SUPERVISED WIRELESS DEVICE NEIGHBOR DISCOVERY" and such as described in U.S. patent application Ser. No. 13/828,617 by Zhu et al., filed on Mar. 14, 2013 and entitled "POWER CONTROL OF NEIGHBOR DISCOVERY SIGNALS," the entire contents of both of which are incorporated herein by reference.

Furthermore, the wireless devices 120 may determine transmission parameters for D2D communications as described in U.S. patent application Ser. No. 13/830,342 by Zhu et al., filed on Mar. 14, 2013, and entitled "NETWORK SUPERVISED DEVICE-TO-DEVICE COMMUNICATION," and such as described in U.S. patent application Ser. No. 14/109,650 by Zhu, et al., filed on Dec. 17, 2013 and entitled "WIRELESS COMMUNICATION PRECODER DETERMINATION," the entire contents of which are incorporated herein by reference.

After determining their neighbors, the wireless devices 120 may use D2D communications to perform a control sequence to gather information about the network 100 to reduce a number of transmission collisions that may occur when message data, such as data resulting from voice, messaging, or data services, among other types of data, is distributed from one of the wireless devices 120 to all of the wireless devices 120 in the network 100. In particular, because the message data may be transferred using distributed scheduling where one wireless device 120 schedules radio resources for transmission by its neighboring wireless devices 120, the information collected during the control sequence may reduce transmission collisions. Radio resources may include a time slot, a range of frequencies, and/or some combination of time slots and ranges of frequencies.

The information collected during the control sequence by a particular wireless device 120 about potential collisions at the particular wireless device 120 may be shared by the particular wireless device 120 to its neighboring wireless devices 120. In particular, the particular wireless device 120 may share the information with one or more of its neighbor wireless devices 120 and the neighbor wireless devices 120 may share the information with one or more of their neighbor wireless devices. With this information, during distribution of the message data, the wireless devices 120 may schedule transmission such that transmission collisions at the particular wireless device may be reduced.

In some embodiments, while the wireless devices 120 use D2D communications to distribute message data and perform a control sequence, the wireless devices 120 may continue discovering their neighbors as described above because the wireless devices 120 may be continuously moving, which may cause their neighboring wireless devices 120 to change. Furthermore, the control sequence may be performed at different intervals during the distribution of the message data because the wireless devices 120 may be continuously moving and causing their neighboring wireless devices 120 to change. The different intervals may be based on a particular duration and/or on an occurrence of a particular event.

In some embodiments, the wireless devices 120 may be configured such that a single wireless device 120 may distribute message data received from multiple wireless devices 120 to all of the wireless devices 120. For example, one wireless device 120 may be configured to receive message data from multiple of the wireless devices 120 using unicast communications, e.g., point-to-point communications. The wireless device 120 that receives the message data from the multiple of the wireless devices 120 may broadcast the message data from the multiple of the wireless devices 120 to all of the wireless devices 120 in the network 100. In these and other embodiments, information about the unicast path may also be distributed among some of the wireless devices 120 to reduce delays in unicast communications between wireless devices 120.

Further description regarding the control sequence and the distribution of message data between wireless devices in a network and the D2D communications between wireless devices to perform control sequence and distribute the message data is discussed with respect to FIGS. 2A-5.

Figure 2A:
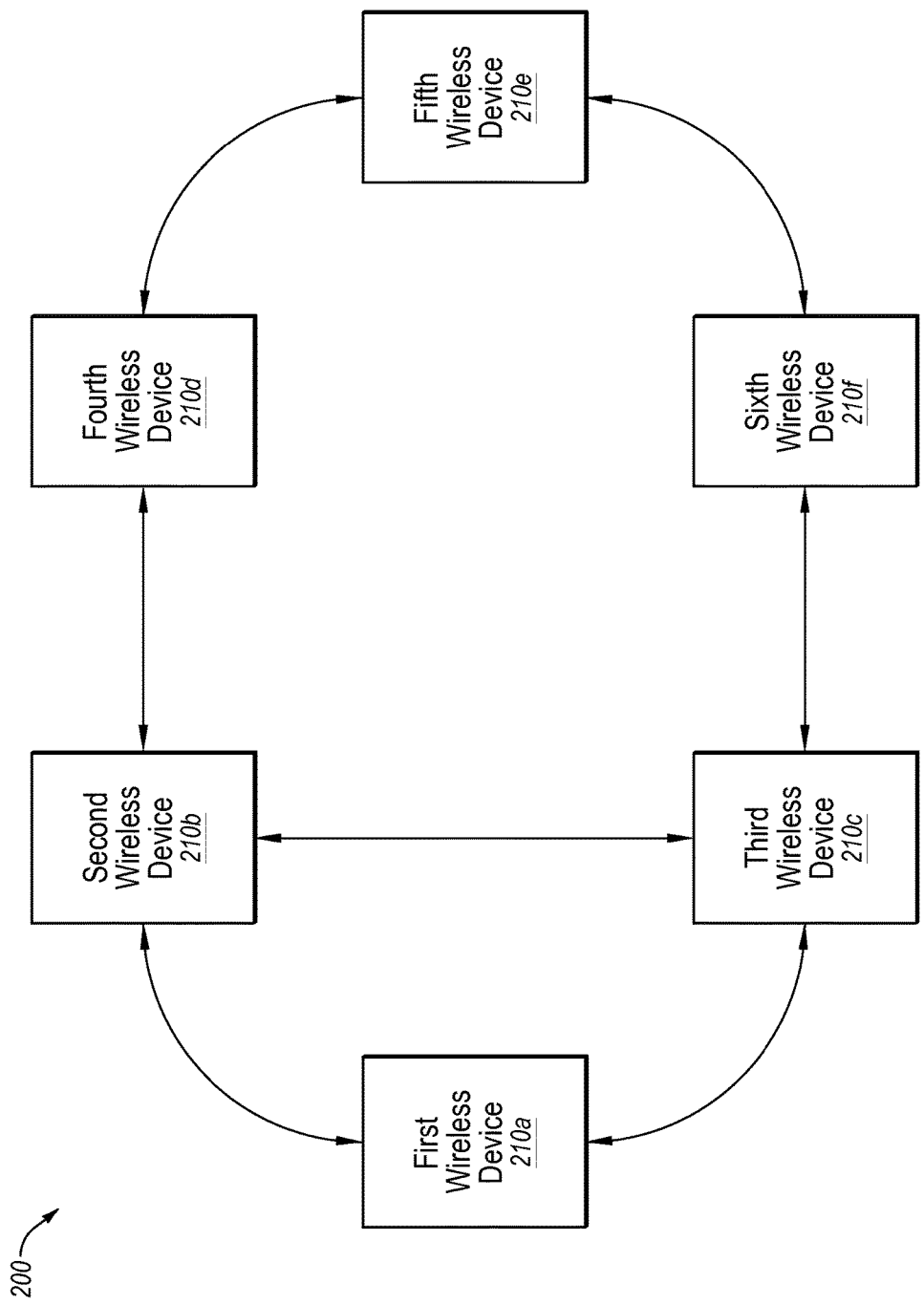
FIG. 2A illustrates another example wireless communication network.

FIG. 2A illustrates another example wireless communication network 200 (referred to hereinafter as "the network 200"), in accordance with at least one embodiment described herein. The network 200 includes first, second, third, fourth, fifth and sixth wireless devices 210a, 210b, 210c, 210d, 210e, and 210f, referred to collectively as the wireless devices 210. The wireless devices 210 may be analogous to the wireless devices 120 of FIG. 1. In the illustrated embodiment of FIG. 2A, it is assumed that the wireless devices 210 have performed neighbor discovery and have a list or some other record of all of or a majority of their neighboring devices. The arrows in FIG. 2A represent neighbor relationships between the wireless devices 210 in FIG. 2A. For example, the first wireless device 210a has the second and third wireless devices 210b and 210c as neighbors; the second wireless device 210b has the first, third, and fourth wireless devices 210a, 210c, and 210d as neighbors; the third wireless device 210c has the first, second, and sixth wireless devices 210a, 210b, and 210f as neighbors; the fourth wireless device 210d has the second and fifth wireless devices 210b and 210e as neighbors, the fifth wireless device 210e has the fourth and sixth wireless devices 210d and 210f as neighbors, and the sixth wireless device 210f has the third and fifth wireless devices 210c and 210e as neighbors. In some embodiments, the wireless devices 210 may know of their neighbors based on neighbor discovery but may not be informed about the other wireless devices 210 in the network 200.

Furthermore, it may be assumed that non-neighboring wireless devices 210 are positioned such that transmissions from non-neighboring wireless devices 210 are sufficiently degraded when arriving at the wireless device 210 that they do not result in transmission collisions sufficient to not allow the wireless devices 210 to receive and decode transmissions from neighboring wireless devices 210. In short, due to the positioning of the wireless devices 210 in the network 200, the potential for transmission collisions that may result in data loss may occur from neighboring wireless devices 210 and not non-neighboring wireless devices 210. Thus, the network 200 may be primarily concerned with scheduling and ensuring transmissions between neighboring wireless devices 210 and disregard transmissions between non-neighboring devices 210.

The wireless devices 210 may be configured such that any message data generated by one of the wireless devices 210, such as voice data from an operator of the one of the wireless devices 210, is provided to all of the wireless devices 210 in the network 200. In the embodiment illustrated in FIG. 2A, no access point or other device may provide direction to the wireless devices 210 regarding how to schedule and distribute the message data among the wireless devices 210 using D2D communications. In these and other embodiments, the wireless devices 210 may determine the scheduling of radio resources for distributing the message data. In particular, the wireless devices 210 that include the message data to distribute may distribute the message data to other of the wireless devices 210 and distribute scheduling of radio resources for the other of the wireless devices 210 to use when further distributing the message data. In contrast, in a network with an access point that determines the scheduling of radio resources for wireless devices, the scheduling of radio resources may be centralized to the access point.

Before and during the distribution of message data, the wireless devices 210 may perform a control sequence to gather information about the wireless devices 210 for scheduling of radio resources. For example, the information may include a relative positioning of the wireless devices 210 with respect to one another, e.g., which of the wireless devices 210 neighbor each other. The relative positioning of the wireless devices 210 may be referred to herein as the distribution of the wireless devices 210. The information may also include potential transmission collisions that may occur based on the distribution of the wireless devices 210. In some embodiments, reducing a number of transmission collisions that may occur in the network 200 may allow the network 200 to operate with less redundancy. As a result, a speed of transmitting message data among the wireless devices in the network 200 may be increased, radio resource usage may be minimized, and/or power requirements of the wireless devices 210 may be reduced, among other changes in the network 200.

During the control sequence, the wireless devices 210 may be assigned a role that the wireless devices 210 may perform during the distribution of message data. The roles include a talking wireless device, a relaying wireless device, and a sink wireless device. The talking wireless devices 210 may be wireless devices 210 that generate message data to provide to the other wireless devices 210 and that are configured to transmit the message data to one or more of the other wireless devices 210. The relaying wireless devices 210 may be wireless devices 210 configured to receive message data from one of the talking or relaying wireless devices 210 and to transmit the message data to other of the wireless devices 210. The sink wireless devices 210 may be wireless devices 210 that receive message data but do not transmit message data.

The talking wireless devices 210 may be further divided into two sub-groups, a broadcasting talking wireless device 210 or unicasting talking wireless devices 210. In general, broadcasting may include communicate message data to all or a majority of the wireless devices 210 in the network 200. In contrast, unicasting may include communicating message data from one wireless device 210 to another wireless device 210.

A broadcasting talking wireless device may generate message data and may broadcast the message data to other wireless devices 210. The broadcasting talking wireless device 210 may also broadcast message data generated by one or more of the unicasting talking wireless devices 210 that sends their message data to the broadcasting talking wireless device 210. A unicasting talking wireless device 210 may have message data to provide to other of the wireless devices 210 and may be configured to unicast the message data to either a unicasting talking wireless device 210 or the broadcasting talking wireless device 210. As described, the network 200 may include one broadcasting talking wireless device 210 and one or more unicasting talking wireless devices 210.

The wireless devices 210 may switch between the different roles based on various factors, including the neighbors of the wireless devices 210, whether the neighbors of the wireless devices 210 have already received message data, whether the wireless devices 210 have message data to provide to other of the wireless devices 210, among other factors.

The control sequence may be started by a broadcasting talking wireless device 210. Before the control sequence, each of the wireless devices 210 may include information about their neighboring wireless devices 210. During the control sequence, the wireless devices 210 may transmit packets to other wireless devices and may receive packets from other of the wireless devices 210. The packets may include information about the distribution of the wireless devices 210, such as the discovered neighbors of the wireless devices 210.

By transmitting and receiving packets, the talking and relaying wireless devices 210 may collect information about each of their neighbor's neighbors. A wireless device's 210 neighbor's neighbors may be referred to herein as two-hop neighbors of the wireless device 210. Direct neighbors of a wireless device 210 may be referred to as one-hop neighbors. For example, the second and third wireless devices 210b and 210c may be one-hop neighbors of the first wireless device 210a and the fourth and sixth wireless devices 210d and 210f may be two-hop neighbors of the first wireless device 210a.

During the control sequence, the wireless devices 210 may be divided into branches of wireless devices 210 that stem from the talking wireless devices 210. A branch of the wireless devices 210 may wireless devices 210 that communicate based on one communication from the talking wireless device 210. For example, FIG. 2A illustrates two branches of the wireless devices 210. The first branch may include the second, fourth, and fifth wireless devices 210b, 210c and 210e and the second branch may include the third and sixth wireless devices 210c and 210f. If the network include a seventh wireless device 210 that is a one-hop neighbor of the first wireless device 210a and a eighth wireless device 210 that is a one-hop neighbor of the seventh wireless device 210 and a two-hop neighbor of the first wireless device 210, the seventh and eighth wireless devices 210 may form an third branch.

To reduce transmission collisions that may occur during the control sequence and/or to reduce the duration of the control sequence, during the control sequence each of the branches of the wireless devices 210 may use orthogonal radio resources for transmitting packets among the wireless devices 210. To allocate the orthogonal radio resources, the broadcasting wireless device 210 may divide all or some of the available radio resources in the network 200 among the wireless devices 210 that it directs to transmit packets. Each of these wireless devices 210 then divides all or some of its allocated radio resources among the wireless devices 210 that it directs to transmit packets. For example, assume that the first wireless device 210a transmits using a first group of radio resources, for example time slots 1-12. The first wireless device 210a may direct the second and third wireless devices 210b and 210c to transmit packets and may allocate radio resources from its radio resources for each of the second and third wireless devices 210b and 210c. For example, the second wireless device 210b may be allocated time slots 1-6 and the third wireless device 210c may be allocated time slots 7-12. The second wireless device 210b may allocate its resources to the fourth wireless device 210d, e.g., time slots 1-6. If the second wireless device 210b had another neighboring wireless device, the second wireless device 210b may allocate the fourth wireless device 210d a portion of its radio resources, e.g., time slots 1-3, and the other wireless device another portion of its radio resources, e.g., time slots 4-6. In this manner, all of the branches of the wireless devices 210 from the broadcasting wireless device 210 may be transmitting with orthogonal radio resources during the control sequence. How the orthogonal radio resources may reduce collisions during and/or the duration of the control sequence is explained later.

When transmitting and receiving packets during the control sequence, a particular wireless device 210 may also determine if a potential transmission collision may occur at the particular wireless device 210. The potential transmission collision may be the result of multiple of the wireless devices 210 attempting to transmit a packet to the particular wireless device 210. In particular, the potential transmission may occur when multiple wireless devices 210 with different two-hop neighbors transmit packets to the particular wireless device 210. Because the multiple wireless devices 210 have different two-hop neighbors, each of the multiple wireless devices 210 may be in different branches of wireless devices 210 and thus may be transmitting packets with orthogonal resources.

After receiving packets from the multiple wireless devices 210, the particular wireless device 210 may reserve a radio resource for future packet transmission from one of the multiple wireless devices 210 to the particular wireless device 210. The particular wireless device 210 may also notify the one of the multiple wireless devices 210 of the reserved radio resource. The one of the multiple wireless devices 210 may inform the two-hop neighbors of the particular wireless device 210 of the reserved radio resource. In these and other embodiments, the two-hop neighbors of the particular wireless device 210 that are informed may be wireless devices 210 that may schedule the one of the multiple wireless devices 210 to transmit packets in the future to the particular wireless device 210. The particular wireless device 210 and the one of the multiple wireless devices 210 may notify the reserved radio resource using radio resources not assigned to the one of the multiple wireless devices 210 and its two-hop neighbors.

The particular wireless device 210 may also indicate the reserved radio resource to others of the multiple wireless devices 210 that attempted to transmit a packet to the wireless device 210 and their one-hop neighbors that schedule packet transmissions to the particular wireless device 210 from the others of the multiple wireless devices 210. As a result, the wireless devices 210 that may schedule a packet transmission to the particular wireless device 210 are aware of the potential transmission collision and may schedule radio resources during message data distribution in light of the reserved radio resources to reduce the number of transmission collisions at the particular wireless device 210 as is explained in more detail below.

An example of the control sequence follows using the first wireless device 210a as the talking wireless device that begins the control sequence. The first wireless device 210a may request its two-hop neighbor information from the second and third wireless devices 210b and 210c using a first group of radio resources. Based on the second and third wireless devices 210b and 210c having one-hop neighbors that are not one-hop neighbors of the first wireless device 210a, the first wireless device 210a may direct the second and third wireless devices 210b and 210c to collect their two-hop neighbor information and may assign the second and third wireless devices 210b and 210c as relaying wireless devices. The second wireless device 210b may be directed to use a second group of radio resources that are part of the first group of radio resources. The third wireless device 210c may be directed to use a third group of radio resources separate from the second group of radio resources that is also part of the first group of radio resources.

The second wireless device 210b may request its two-hop neighbor information from the fourth wireless device 210d using the second group of radio resources. Based on the fourth wireless device 210d having one-hop neighbors that are not one-hop neighbors of the second wireless device 210b, the second wireless device 210b may direct the fourth wireless device 210d to collect the fourth wireless device's 210d two-hop neighbor information and may assign the fourth wireless device 210d as a relaying wireless device. The fourth wireless device 210d may be directed to use the second group of radio resources.

The third wireless device 210c may request its two-hop neighbor information from the sixth wireless device 210f using the third group of radio resources. Based on the sixth wireless device 210f having one-hop neighbors that are not one-hop neighbors of the first and third wireless devices 210a and 210c, the third wireless device 210c may direct the sixth wireless device 210f to collect the sixth wireless device's 210f two-hop neighbor information and may assign the sixth wireless device 210f as a relaying wireless device. The sixth wireless device 210f may be directed to use the third group of radio resources.

Based on the distribution of the wireless devices 210 in the network 200, the fourth and sixth wireless devices 210d and 210f are not aware that the fifth wireless device 210e is a neighbor of both the fourth and sixth wireless devices 210d and 210f. As a result, both the fourth and sixth wireless devices 210d and 210f may request two-hop neighbor information from the fifth wireless device 210e. As a result, a potential transmission collision may occur during the control sequence and thus during message data distribution because both the fourth and sixth wireless devices 210d and 210f, acting as relaying wireless devices, may attempt to send message data to the fifth wireless device 210e.

Other networks may compensate for this potential transmission collision by having the fourth and sixth wireless devices 210d and 210f wait long periods between transmission to avoid the collisions or having the fourth and sixth wireless devices 210d and 210f repeatedly attempt to send transmissions until a collision does not occur at the fifth wireless devices 210e so that the fifth wireless device 210e may respond. These methods increase a latency of the networks.

To avoid an increased latency of the network 200 during message data distribution, the network 200 as described above provides information to the second and third wireless devices 210b and 210c about the potential transmission conflict such that the second and third wireless devices 210b and 210c when scheduling transmissions for the fourth and sixth wireless devices 210d and 210f during message data distribution may avoid the potential transmission collisions at the fifth wireless devices 210e.

A discussion of how the information may be provided to the second and third wireless devices 210b and 210c follows. The fifth wireless device 210e during the control sequence may receive a request for two-hop neighbor information from both the fourth and sixth wireless devices 210d and 210f. The order in which the fifth wireless device 210e receives the requests from the fourth and sixth wireless devices 210d and 210f may determine which of the fourth and sixth wireless devices 210d and 210f may relay future message data to the fifth wireless device 210e. In this example, the fourth wireless device 210d sends the request to the fifth wireless device 210e first. As a result, the fourth wireless device 210d and not the sixth wireless device 210f may relay future message data to the fifth wireless device 210e.

The fifth wireless device 210e may receive the request from the fourth wireless device 210d to send information about its two-hop neighbors. The request may be sent using the second group of radio resources. The fifth wireless device 210e may respond using the second group of radio resources to the fourth wireless device 210d.

The fifth wireless device 210e may then receive the request from the sixth wireless device 210f to send information about its two-hop neighbors. After the fifth wireless device 210e receives a second request for information about its two-hop neighbors, the fifth wireless device 210e may realize that a potential transmission collision may occur in the future. The fifth wireless device 210e may reserve radio resources from all available radio resources in the network 200 over which the fifth wireless device 210e may receive future message data. The reserved radio resources for the message data are not constrained by the orthogonal distribution of radio resources used during the control sequence.

After selecting the reserved radio resources, the fifth wireless device 210e may indicate the reserved radio resources to the fourth wireless device 210d using the third group of radio resources. Note that the third group of radio resources may not be allocated for use by the second and fourth wireless devices 210b and 210d during the control sequence by the first wireless device 210a. As a result, no transmission collisions may occur with other transmissions from the fourth wireless device 210d. The fourth wireless device 210d may indicate the reserved radio resources for transmitting to the fifth wireless device 210e to the second wireless device 210b using the third group of radio resources. The second wireless device 210b may record the reserved radio resources for the fifth wireless device 210e. As a result, when scheduling future message data transmission for the fourth wireless devices 210d to the fifth wireless devices 210e, the second wireless device 210b may schedule the future message data transmissions using the reserved radio resources.

After selecting the reserved radio resources, the fifth wireless device 210e may provide information to the sixth wireless device 210f that indicates that the fifth wireless device 210e does not expect transmissions from the sixth wireless device 210f and that also indicates the reserved radio resource for transmitting to the fifth wireless device 210e such that the sixth wireless device 210f does not transmit using the reserved radio resource. The fifth wireless device 210e may provide the information to the sixth wireless devices 210f using the third group of resources. The sixth wireless device 210f may provide the information to the third wireless device 210c using the third group of resources. As a result, when scheduling future message data transmission for the sixth wireless device 210f, the third wireless device 210c may not schedule the sixth wireless device 210f to transmit to the fifth wireless device 210 and may not schedule the sixth wireless devices 210f to use the reserved radio resources to transmit to other wireless devices 210 that neighbor the sixth wireless device 210f.

In these and other embodiments, the fifth wireless device 210e and the sixth wireless device 210f may be designated as sink wireless devices because both the fifth and sixth wireless devices 210e and 210f may not relay message data during message data distribution. Because the fifth and sixth wireless devices 210e and 210f are designated as sink wireless devices, the fifth and sixth wireless devices 210e and 210f may not schedule transmission for any other wireless device 210. As a result, the fifth and sixth wireless devices 210e and 210f may not determine their two-hop neighbors during the control sequence because the information about two-hop neighbors is used for scheduling transmissions and if the fifth and sixth wireless devices 210e and 210f are not scheduling transmissions for other wireless devices 210 the fifth and sixth wireless devices 210e and 210f may not use the two-hop neighbor information. As a result, the control sequence is not designed to provide the fifth and sixth wireless devices 210e and 210f with their two-hop neighbor information.

In short, the control sequence operates to inform relaying and talking wireless devices 210 which of the wireless devices 210 are their two-hop neighbors such that the relaying and talking wireless devices 210 may schedule message data transmission with reduced or no transmission conflicts. Further, during the control sequence, the wireless devices 210 may identify situations where potential transmission conflicts may occur from two wireless devices 210 attempting to transmit to a particular wireless device 210. During the control sequence, the radio resource scheduling wireless devices 210 for the two wireless devices 210 that may attempt to transmit to the particular wireless device 210 may be made aware of the potential conflict transmission. To avoid the potential transmission conflict, one of the scheduling wireless devices 210 may schedule one of the two wireless devices 210 to transmit to the particular wireless device 210 using a reserved radio resource. The other one of the scheduling wireless devices 210 may not schedule the other of the two wireless devices 210 to transmit to the particular wireless device and may not schedule the other of the two wireless devices 210 to transmit using the reserved radio resource. As a result, within the area of the particular wireless device 210, the scheduled one of the two wireless devices 210 may transmit using the reserved radio resource and the other one of the two wireless devices 210 may not transmit using the reserved radio resource such that reduced or no transmission conflicts occur.

The distribution of the wireless devices 210 may change, however, as the wireless devices 210 move in the network 200. Accordingly, the role of the wireless devices 210 and the configuration of scheduling information may change based on changes in the distribution of the wireless devices 210.

Figure 2B:
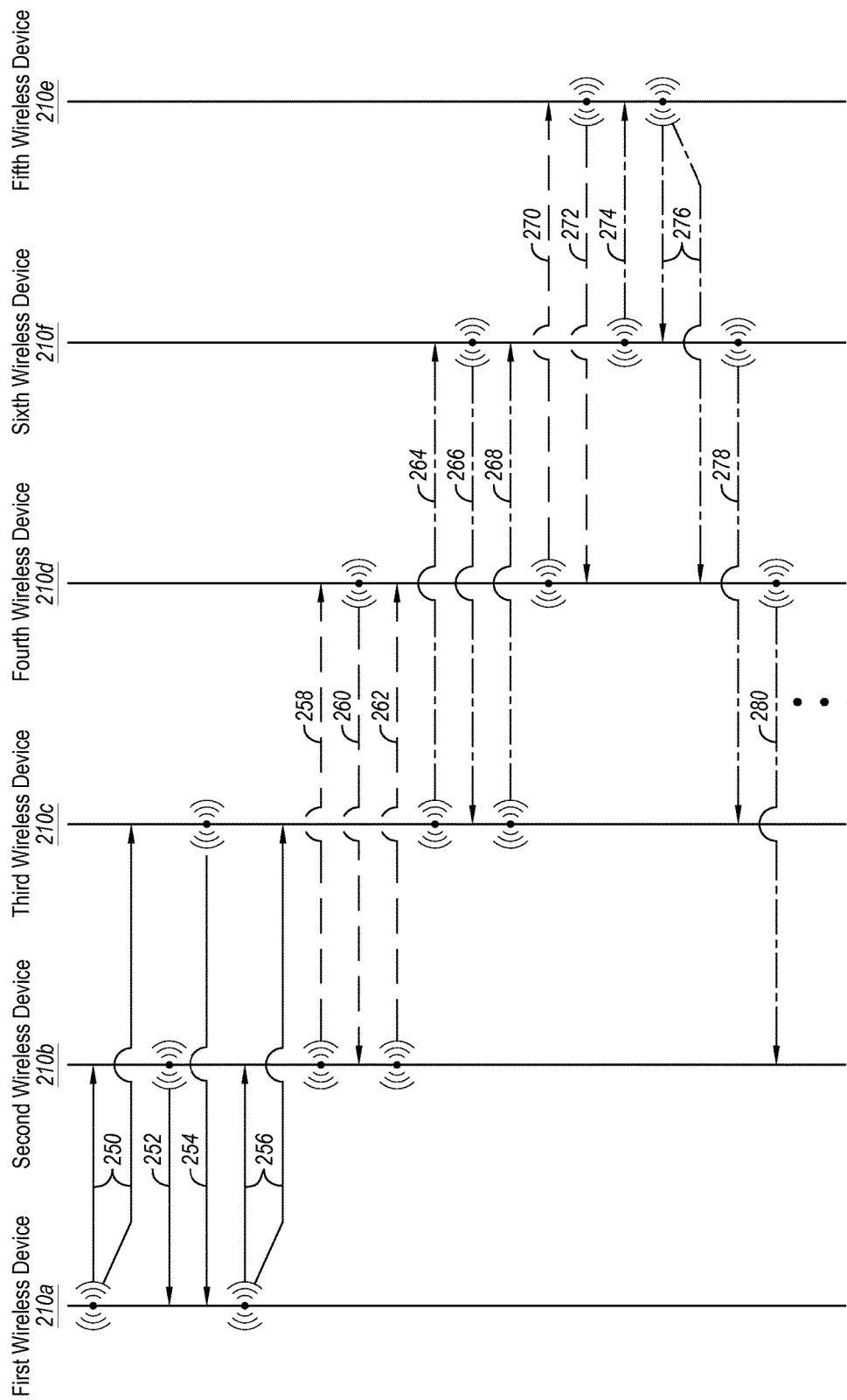
FIG. 2B illustrates example signaling within the example wireless communication network of FIG. 2A.

FIG. 2B illustrates example signaling within the network 200 of FIG. 2A, in accordance with at least one embodiment described herein. In particular, FIG. 2B illustrates packet transmissions among the wireless devices 210 that occurs during a control sequence. In this example, the first wireless device 210a may be a talking wireless device that starts a control sequence in the network 200.

The first wireless device 210a may have message data to distribute to the wireless devices 210. For example, a user of the first wireless device 210a may speak into the first wireless device 210a and the first wireless device 210a may convert what is spoken by the user into message data. The first wireless device 210a may determine that there is no other talking wireless device 210 in the network 200. As a result, the first wireless device 210a may initiate a control sequence before distributing the message data to reduce a number of transmission collisions.

The first wireless device 210 may generate and transmit a packet 250 that requests its neighboring wireless devices 210, e.g., the second and third wireless devices 210b and 210c, to provide a list of their neighboring wireless devices to the first wireless device 210a. The packet 250 may be transmitted using radio resources from a first group of radio resources. As illustrated in FIG. 2B, packets transmitted using radio resources from a first group of radio resources are illustrated with solid lines and includes packets 250, 252, 254, and 256. Packets transmitted using radio resources from a second group of radio resources that is a subset of the first group of radio resources are illustrated with consistently sized dashed lines and include packets 258, 260, 262, 270, and 272. Packets transmitted using radio resources from a third group of radio resources that is a subset of the first group of radio resources and separate from the second group of radio resources are illustrated with irregular sized dashed lines and include packets 264, 266, 268, 274, 276, 278, and 280. For example, if the first group of radio resources includes time slots 1-10, the second group of radio resources may include time slots 1-5 and the third group of radio resources may include time slots 6-10. Thus, the second and third groups of radio resources may be orthogonal subsets of radio resources from the first group of radio resources. Furthermore, the packets transmitted within one of the respective first, second, and third groups of radio resources may be transmitted using any of the radio resources within the respective group of radio resources.

The second wireless device 210b may receive the packet 250 and in response may generate a packet 252 that includes the neighbors of the second wireless device 210b. In some embodiments, the packet 250 may include a list of the neighbors of the first wireless device 210a. In these and other embodiments, the packet 252 may include the two-hop neighbors of the first wireless device 210a with respect to the second wireless device 210b being an intermediate neighbor, e.g., the fourth wireless device 210d. The packet 250 may further include an indication of the radio resources from the first group of radio resources that the second wireless device 210b may use to transmit the packet 252. The second wireless device 210b may transmit the packet 252 to the first wireless device 210a using the radio resources indicated in the packet 250.

The third wireless device 210c may receive the packet 250 and in response may generate a packet 254 that includes the neighbors of the third wireless device 210c. In some embodiments, the packet 250 may include a list of the neighbors of the first wireless device 210a. In these and other embodiments, the packet 254 may include the two-hop neighbors of the first wireless device 210a with respect to the third wireless device 210c being an intermediate neighbor, e.g., the sixth wireless device 210f. The packet 250 may further include an indication of the radio resources from the first group of radio resources that the third wireless device 210c may use to transmit the packet 254. The second wireless device 210b may transmit the packet 254 to the first wireless device 210a using the radio resources indicated in the packet 250. In these and other embodiments, the radio resources used to transmit the packet 252 and the packet 254 may be different radio resources from the first group of radio resources.

The first wireless device 210a may receive the packets 252 and 254 and may determine its two-hop neighbors. The first wireless device 210a may also determine which of its one-hop neighbors may request neighbor information from their one-hop neighbors. In the embodiment illustrated in FIG. 2A, both the second and third wireless devices 210b and 210b may be one-hop neighbors that may request one-hop neighbor information of their one-hop neighbors.

In some embodiments, a wireless device 210 may request that all of its one-hop neighbors request neighbor information from their one-hop neighbors. Alternately or additionally, a wireless device 210 may not request that all of its one-hop neighbors request neighbor information from their one-hop neighbors. Rather, the wireless device 210 may request a subset of its one-hop neighbors to request neighbor information. The subset of its one-hop neighbors however may be selected such that all of the two-hop neighbors of the wireless device 210 are requested to provide their neighbor information.

For example, assume that the network 200 included a seventh wireless device that is a neighbor of the first, second, and fourth wireless devices 210a, 210b, and 210d. After collecting the neighbor information of the second and third wireless devices 210b and 210c and the seventh wireless devices, the first wireless device 210a may determine that its two-hop neighbor, the fourth wireless device 210d may be contacted by either the second wireless device 210b or the seventh wireless device. The first wireless device 210a may select one of the second wireless device 210b or the seventh wireless device to continue requesting neighbor information. In these embodiments, the seventh wireless device may be a sink wireless device and the second wireless device 210*b* may be a relaying wireless device.

In the illustrated embodiment, the first wireless device 210*a* may generate a packet 256 to direct the second and third wireless devices 210*b* and 210*c* to collect their one-hop neighbor information. The packet 256 may also assign the second wireless device 210*b* to use the second group of radio resources for future packet transmissions and the third wireless device 210*c* to use the third group of radio resources for future packet transmissions.

The second wireless device 210*b* may receive the packet 256. In response, the second wireless device 210*b* may generate a packet 258 that requests its neighboring wireless devices 210, e.g., the fourth wireless devices 210*d* to provide a list of its neighboring wireless devices to the second wireless device 210*b*. The second wireless device 210*b* may transmit the packet 258. The packet 258 may be transmitted using radio resources from the second group of radio resources.

The fourth wireless device 210*d* may receive the packet 258 and in response may generate a packet 260 that includes the one-hop neighbors of the fourth wireless device 210*d*. In some embodiments, the packet 258 may include a list of the one-hop neighbors of the second wireless device 210*b*. In these and other embodiments, the packet 260 may include the one-hop neighbors of the fourth wireless device 210*d* not already known to the second wireless device 210*b*. The packet 258 may further include an indication of the radio resources from the second group of radio resources that the fourth wireless device 210*d* may use to transmit the packet 260. The fourth wireless device 210*d* may transmit the packet 260 to the second wireless device 210*b* using the radio resources indicated in the packet 258 from the second group of radio resources.

The second wireless device 210*b* may receive the packet 262 and may determine its two-hop neighbors. The second wireless device 210*b* may generate a packet 262 to direct the fourth wireless device 210*d* to collect the one-hop neighbor information of the fourth wireless device 210*d*. The packet 262 may also assign the fourth wireless device 210*d* to use the second group of radio resources when transmitting future packets.

The third wireless device 210*c* may receive the packet 256. In response, the third wireless device 210*c* may generate a packet 264 that requests its neighboring wireless devices 210, e.g., the sixth wireless device 210*f* to provide a list of its neighboring wireless devices to the third wireless device 210*c*. The third wireless device 210*c* may transmit the packet 264. The packet 264 may be transmitted using radio resources from the third group of radio resources.

The sixth wireless device 210*f* may receive the packet 264 and in response may generate a packet 266 that includes one-hop neighbors of the sixth wireless device 210*f* In some embodiments, the packet 264 may include a list of the one-hop neighbors of the third wireless device 210*c*. In these and other embodiments, the packet 266 may include the one-hop neighbors of the sixth wireless device 210*f* not already known to the third wireless device 210*c*. The packet 266 may further include an indication of the radio resources from the third group of radio resources that the sixth wireless device 210*f* may use to transmit the packet 266. The sixth wireless device 210*f* may transmit the packet 266 to the third wireless device 210*c* using the radio resources indicated in the packet 264 from the third group of radio resources.

The third wireless device 210*c* may receive the packet 266 and may determine its two-hop neighbors. The third wireless device 210*c* may generate a packet 268 to direct the sixth wireless device 210*f* to collect its one-hop neighbor information. The packet 268 may also assign the sixth wireless device 210*f* to use the third group of radio resources when transmitting future packets.

The fourth wireless device 210*d* may receive the packet 268. In response, the fourth wireless device 210*d* may generate a packet 270 that requests its neighboring wireless devices 210, e.g., the fifth wireless device 210*e* to provide a list of its neighboring wireless devices to the fourth wireless device 210*d*. The fourth wireless device 210*d* may transmit the packet 270. The packet 270 may be transmitted using radio resources from the second group of radio resources.

The fifth wireless device 210*e* may receive the packet 270 and in response may generate a packet 272 that includes the neighbors of the fifth wireless device 210*e*. The packet 270 may further include an indication of the radio resources from the second group of radio resources that the fifth wireless device 210*e* may use to transmit the packet 272. The fifth wireless device 210*e* may transmit the packet 272 to the fourth wireless device 210*d* using the radio resources indicated in the packet 270 from the second group of radio resources. The fourth wireless device 210*d* may receive the packet 272 and based on the information in the packet 272, may determine its two-hop neighbors with respect to the fifth wireless device 210*e* being an intermediate neighbor.

The sixth wireless device 210*f* may receive the packet 268. In response, the sixth wireless device 210*f* may generate a packet 272 that requests its neighboring wireless devices 210, e.g., the fifth wireless device 210*e* to provide a list of its neighboring wireless devices to the sixth wireless device 210*f* The sixth wireless device 210*f* may transmit the packet 274. The packet 274 may be transmitted using radio resources from the third group of radio resources.

The fifth wireless device 210*e* may receive the packet 274. The packet 274 may be the second packet requesting that the fifth wireless device 210 provide information about its neighboring wireless devices. Accordingly, the fifth wireless device 210*e* may determine that a potential transmission collision may occur at the fifth wireless device 210*e*. The fifth wireless device 210*e* may generate a packet 276. The packet 276 may indicate a reserved radio resource for future transmission to the fifth wireless device 210*e*. The packet 276 may also direct the fourth wireless device 210*d* to transmit future packets to the fifth wireless device 210*e* using the reserved radio resource. The packet 276 may also direct the sixth wireless device 210*f* to not transmit further packets to the fifth wireless device 210*e* and to not transmit packets using the reserved radio resource. The packet 276 may be transmitted to both the fourth and sixth wireless devices 210*d* and 210*f* using radio resources from the third group of radio resources. In some embodiments, the radio resources used to transmit the packet 276 may be radio resources indicated in the packet 274 or other radio resources from the third group of radio resources.

The sixth wireless device 210*f* may receive the packet 276 and, in response, may generate packet 278 to transmit to the third wireless device 210*c*. The packet 278 may indicate the reserved radio resource that the sixth wireless device 210 may not use for packet transmission. The packet 278 may also indicate that the sixth wireless device 210*f* may not transmit to the fifth wireless device 210*e*. Furthermore, the packet 278 may be transmitted using radio resources from the third group of radio resources. As a result of the packet 278, the third wireless device 210*c* may not schedule the sixth wireless device 210*f* to transmit to the fifth wireless device 210*e* or to transmit using the reserved radio resource.

The fourth wireless device 210d may also receive the packet 276 and, in response, may generate packet 280 to transmit to the second wireless device 210b. The packet 280 may indicate the reserved radio resource for transmitting to the fifth wireless device 210e. Furthermore, the packet 280 may be transmitted using radio resources from the third group of radio resources. Thus, when scheduling the radio resources for transmitting packets to the fifth wireless device 210e from the fourth wireless device 210d, the second wireless device 210b may use the reserved radio resources.

Returning to FIG. 2A, after having performed the control sequence, the first wireless device 210a may be configured to broadcast the message data. The wireless devices 210 may be configured such that any message data generated by one of the wireless devices 210, such as voice data from an operator of the one of the wireless devices 210, is provided to all of the wireless devices 210 in the network 200. During the distribution of message data, the wireless devices 210 may perform one or more of the three different roles discussed previously, the talking wireless device, the relaying wireless device, and the sink wireless device.

The wireless devices 210 may be configured to distribute the message data using packets. The packets may include the message data to be distributed among the wireless devices 210 and/or other information to enable the wireless devices 210 to distribute the data. For example, the packets may include type data regarding the type of packet. For example, the type data may indicate that it is a packet for broadcasting to all the wireless devices 210. Alternately or additionally, the type data may indicate that the packet is for unicasting to a particular wireless device of the wireless devices 210. Alternately or additionally, the type data may indicate that the packet is for broadcasting to all the wireless devices 210 and that the packet includes additional information for establishing, maintaining, and/or terminating a unicast between two of the wireless devices 210.

The packets may include additional information as well. For example, the packets may include information about the wireless devices 210 in the network that have transmitted the packet. The information about the wireless devices 210 that have transmitted the packet may be used by a wireless device 210 to determine one or more unicast paths for unicasting future packets between two of the wireless devices 210. Alternately or additionally, the information about the wireless devices 210 that have transmitted the packet may be used by the wireless devices 210 to determine which of the wireless devices 210 have received the packet and if the packet needs to be retransmitted. Alternately or additionally, the packets may include information about timing and scheduling for future transmission of the packets by other of the wireless devices 210 in the network 200. For example, when a packet is transmitted to neighboring wireless devices 210, each of the neighboring wireless devices 210 may be assigned a radio resource, such as a time slot, for relaying or retransmitting the packet by the wireless device 210 that transmits the packet using the two-hop neighbor information collected during the control sequence. Furthermore, the assigned radio resources may be based on any potential transmission collisions detected during the control sequence.

The wireless devices 210 may be configured such that multiple wireless devices 210 may be providing message data to the other wireless devices 210 at the same time. However, the wireless devices 210 may be configured such that one of the wireless devices 210 broadcasts an aggregation of the message data being generated by the multiple wireless devices 210 to all or substantially all of the wireless devices 210 in the network 200. By having one wireless device 210 broadcast to all or substantially all of the wireless devices 210 in the network 200, resources of the network 200 may be conserved.

For example, once a wireless device 210 is broadcasting, if another wireless device 210 generates message data from input from a user, the another wireless device 210 may establish a unicast link to the broadcasting wireless device 210. After establishing the unicast link, the unicasting wireless device 210 may unicast its message data to the broadcasting wireless device 210. The broadcasting wireless device 210 may aggregate the message data with the message data from the unicasting wireless device 210 and may broadcast the aggregated message data.

When establishing the unicast between the unicasting wireless device 210 and the broadcasting wireless device 210, the unicasting wireless device 210 may first indicate to the broadcasting wireless device 210 that the unicasting wireless device 210 has message data to unicast. In these and other embodiments, the unicasting wireless device 210 may send a packet requesting a unicast to the broadcasting wireless device 210. The unicasting wireless device 210 may send the packet over a unicast path based on data received from other packets broadcast from the broadcasting wireless device 210. The unicast path, for example, may be a path among the wireless devices 210 that a previous packet traversed from the broadcasting wireless device 210 to the unicasting wireless device 210.

The unicasting wireless device 210 may send the packet requesting a unicast to the broadcasting wireless device 210 using radio resources that are reserved for establishing unicasts between wireless devices 210. The reserved radio resources for establishing a unicast may be reserved during the control sequence or at some other time. For example, each wireless device 210 may have an internal indication of the reserved radio resources for establishing a unicast that is set at the time of manufacture or before the wireless device joins the network 200. Alternately or additionally, the reserved radio resources for establishing a unicast link may be set during the control sequence or some other time before a unicast link may be established. As a result, the unicasting wireless device 210 may send the packet requesting the unicast with reduced potential for transmission collisions with other wireless devices 210.

The broadcasting wireless device 210 may receive the packet with the unicast request and may determine radio resources that may be used by the unicasting wireless device 210 and other wireless devices 210 along the unicast path when transmitting a unicast packet from the unicasting wireless device 210 to the broadcasting wireless device 210. The radio resources used by unicast packet transmissions between the broadcasting wireless device 210 and the unicasting wireless device 210 after the establishment of the unicast between the broadcasting wireless device 210 and the unicasting wireless device 210 may not be the same as the reserved radio resources for establishing a unicast link. In some embodiments, the reserved radio resources for establishing a unicast link may be reserved for establishing a unicast link. Once a unicast link is established, different radio resources may be used to maintain the unicast link. As a result, multiple different unicast links between multiple different wireless devices 210 and the broadcasting wireless device 210 may be established without potentially transmission collisions occurring when a unicast link is established.

After determining a reserved radio resource for the unicast link, the broadcasting wireless device 210 may send a confirmation packet back to the unicasting wireless device 210 that indicates that a unicast link is established between the broadcasting wireless device 210 and the unicasting wireless device 210 and that indicates the reserved radio resource for future unicast transmissions. The confirmation packet may be transmitted using the reserved radio resources for establishing unicasts between the wireless devices 210.

The wireless devices 210 along the unicast path that receive and relay the confirmation packet and the unicasting wireless device 210 may note the reserved unicast radio resource for the future unicast packets transmitted between the unicasting wireless device 210 and the broadcasting wireless device 210. The wireless devices 210 along the unicast path may reserve the reserved unicast radio resource for the future unicast packets transmitted such that the wireless devices 210 may receive and transmit unicast packets with reduced delay.

After or while establishing the unicast, the broadcasting wireless device 210 may further direct the wireless devices 210 in the unicast path to update their one-hop and/or two-hop neighbors about the reserved unicast radio resources. In some embodiments, the broadcasting wireless device 210 may direct the wireless devices 210 in the unicast path to update their two-hop neighbors. Alternately or additionally, the broadcasting wireless device 210 may request that all of the wireless devices 210 update their one-hop and/or two-hop neighbors regarding their status, including reserved radio resources that may or may not be used for the wireless devices 210. When updating their one-hop and/or two-hop neighbors, the wireless devices 210 in the unicast path may indicate that they may be unicasting packets using the reserved unicast radio resource and that they may receive other packets, such as broadcast packets from the broadcasting wireless device 210, but not on the reserved unicast radio resources. Alternately or additionally, the wireless devices 210 in the unicast path may indicate that its one-hop neighbors may not use the reserved unicast radio resource.

By providing the reserved unicast radio resources to the one-hop and two-hop neighbors of the wireless device 210 in the unicast path, the wireless device 210 in the unicast path may receive and transmit unicast packets using the reserved unicast radio resources a reduced or eliminated potential for transmission collisions of the unicast packets with other transmitted packets.

A general example of establishing and maintaining a unicast in the network 200 follows. The first wireless device 210a may broadcast first message data in a first packet to all of the wireless devices 210. The fourth wireless device 210d may generate second message data to be broadcast to all of the wireless devices 210. The fourth wireless device 210d may receive the first packet with the first message data from the first wireless device 210a. The first packet may include data indicating the path that the first packet followed to reach the fourth wireless device 210d from the first wireless device 210a. For example, the path data may indicate the wireless devices 210 that relayed the first packet to the fourth wireless device 210d, e.g., the second wireless device 210b and the broadcasting wireless device 210. The fourth wireless device 210d may generate a second packet with the second message data and with the path data. The fourth wireless device 210d may transmit the second packet to the second wireless device 210b. The fourth wireless device 210d may transmit the second packet using first radio resources that have been reserved for establishing a unicast path.

The second wireless device 210b may receive the second packet and may transmit the second packet to the first wireless device 210a using the first radio resources. The first wireless device 210a may receive the second packet and may select second radio resources for future unicast transmissions between the fourth and first wireless devices 210d and 210a. The first wireless device 210a may generate a third packet indicating the second radio resources and may transmit the third packet to the second wireless device 210b using the first radio resources. The second wireless device 210b may note the second radio resources and may transmit the third packet to the fourth wireless device 210d using the first radio resources.

The fourth wireless device 210d may receive the third packet and thus confirmation that a unicast is established between the first and fourth wireless devices 210a and 210d. The fourth wireless device 210d may also note the second radio resources for transmitting unicast packets to the first wireless device 210a.

The first wireless device 210a may also direct the second and fourth wireless devices 210b and 210d to indicate to their neighbor wireless devices 210 that they have second radio resources reserved for a unicast.

The fourth wireless device 210d may then generate message data based on input from a user and may generate a fourth packet with the message data. The fourth packet may be a unicast packet that may be transmitted using the second radio resource to the second wireless device 210b. The second wireless device 210b may receive the fourth packet and give priority to the fourth packet because it is a unicast packet. The second wireless device 210b may transmit the fourth packet to the first wireless device 210a using the second radio resources. The first wireless device 210a may aggregate the message data from the fourth packet with additional message data generated by the first wireless device 210a and broadcast the aggregated message data to the wireless devices 210.

To broadcast the aggregated message data, the first wireless device 210a may generate a fifth packet. The first wireless device 210a may also schedule radio resources for the second and third wireless devices 210b and 210c to rebroadcast the fifth packet and include the scheduled radio resources in the fifth packet. The first wireless device 210a may transmit the fifth packet to the second and third wireless devices 210b and 210c.

The second and third wireless devices 210b and 210c may receive the fifth packet. The second and third wireless devices 210b and 210c may present the aggregated message data from the fifth packet to respective users of the second and third wireless devices 210b and 210c.

The second wireless device 210b may also schedule radio resources for the fourth wireless device 210d to retransmit the fifth packet. In these and other embodiments, the second wireless device 210b may schedule the reserved radio resources for the fourth wireless device 210d to transmit to the fifth wireless device 210e based on the control sequence previously performed. The second wireless device 210b may include the scheduled radio resources in the fifth packet and retransmit the fifth packet to the fourth wireless device 210d using the radio resources scheduled by the first wireless device 210a and indicated in the fifth packet.

The fourth wireless device 210d may receive the fifth packet and present the message data from the first wireless device 210a that was aggregated with the message data that the fourth wireless device 210d generated to a user of the fourth wireless device 210d. The fourth wireless device 210d may then retransmit the fifth packet to the fifth wireless device 210e using the reserved radio resources for the fifth wireless device 210e.

The third wireless device 210c may retransmit the fifth packet to the sixth wireless device 210f using the radio resources scheduled by the first wireless device 210a and included in the fifth packet. The third wireless device 210c may not schedule the sixth wireless device 210f to retransmit the fifth packet to the fifth wireless device 210e even though the fifth wireless device 210e is a neighbor of the sixth wireless device 210f based on the information collected during the control sequence previously performed.

In some embodiments, the sixth wireless device 210f may include another neighboring wireless device 210 (not illustrated). In these and other embodiments, the third wireless device 210c may schedule the radio resources for the sixth wireless device 210f to transmit to the other wireless device 210. The radio resources for transmitting to the other wireless device may be any radio resources selected by the third wireless device 210c besides the radio resources that are reserved by the fifth wireless device 210e for transmissions from the fourth wireless device 210d.

In some embodiments, when a wireless device 210 schedules radio resources for other of the wireless devices 210, the wireless device 210 may indicate the specific radio resource to use. For example, the wireless device 210 may indicate a specific frequency range and a specific time frame for the scheduled resource. Alternately or additionally, each of the wireless devices 210 may include a radio resource map. The map may be a two dimensional map with rows of the map indicating a resource number and columns of the map representing a time frame. For each resource number and time frame, the map may indicate a range of frequencies. In these and other embodiments, the map may cover a duration of time that is equal to the combination of time frames in the map. In these and other embodiments, the wireless device 210 may schedule radio resources for other of the wireless devices 210 by assigning the other of the wireless devices 210 a resource number in the map for a duration of time equal to the duration of time of the time frames in the map. The other wireless devices 210 may determine the radio resources to use based on the current time that corresponds with a time frame in the map and their assigned resource number.

Additional details regarding the distribution of message events and the creation of unicasts is described in U.S. patent application Ser. No. 14/180,902 by Duval et al., filed on Feb. 14, 2014, and entitled "DEVICE-TO-DEVICE WIRELESS COMMUNICATION," the entire contents of which are incorporated herein by reference.

Modifications, additions, or omissions may be made to how the wireless devices 210 communication within the network 200 without departing from the scope of the present disclosure.

Figure 3:
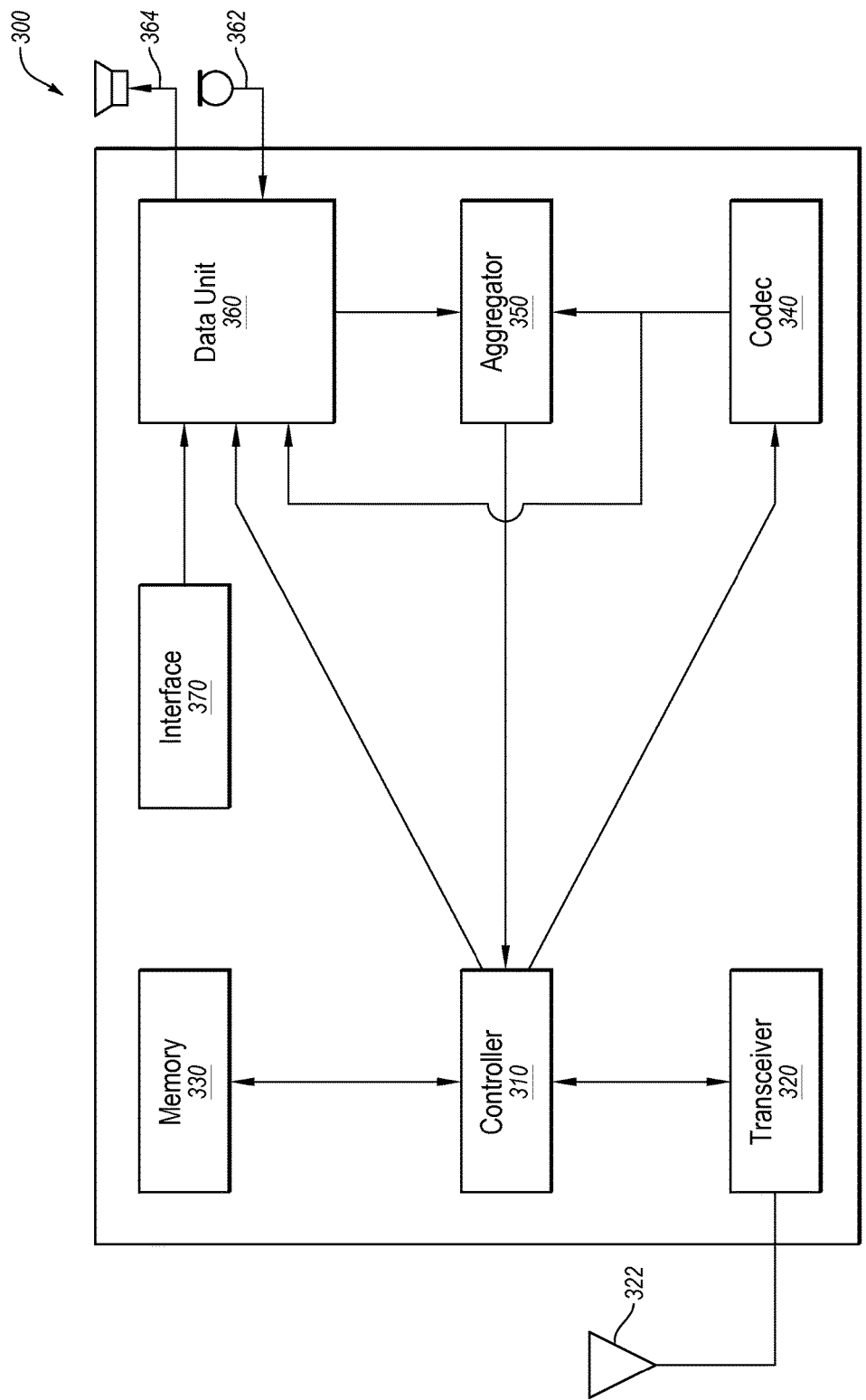
FIG. 3 illustrates an example wireless device that may be used in a wireless communication network.
Figure 4A:
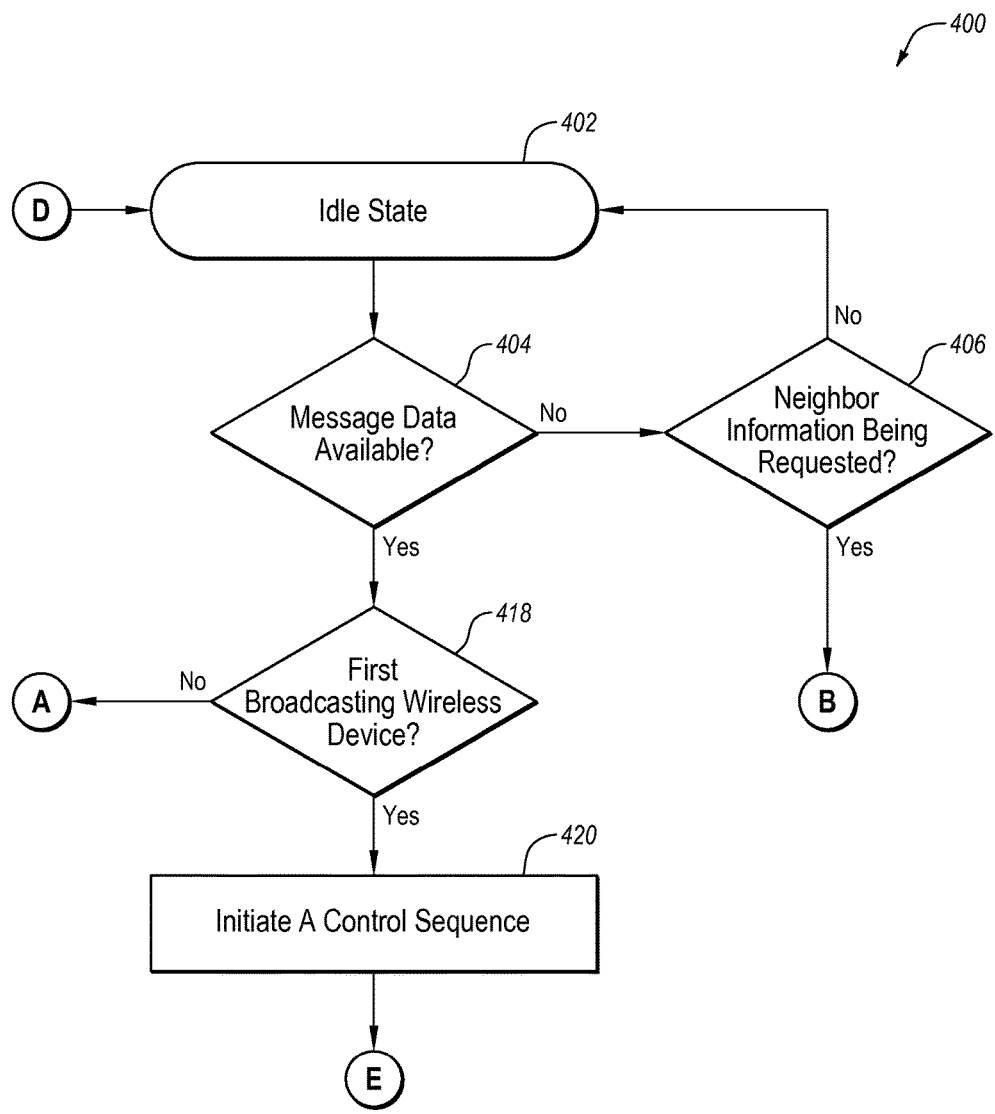
FIGS. 4A-4D are flowcharts of an example method of device-to-device communication by a wireless device in a wireless communication network.
Figure 4B:
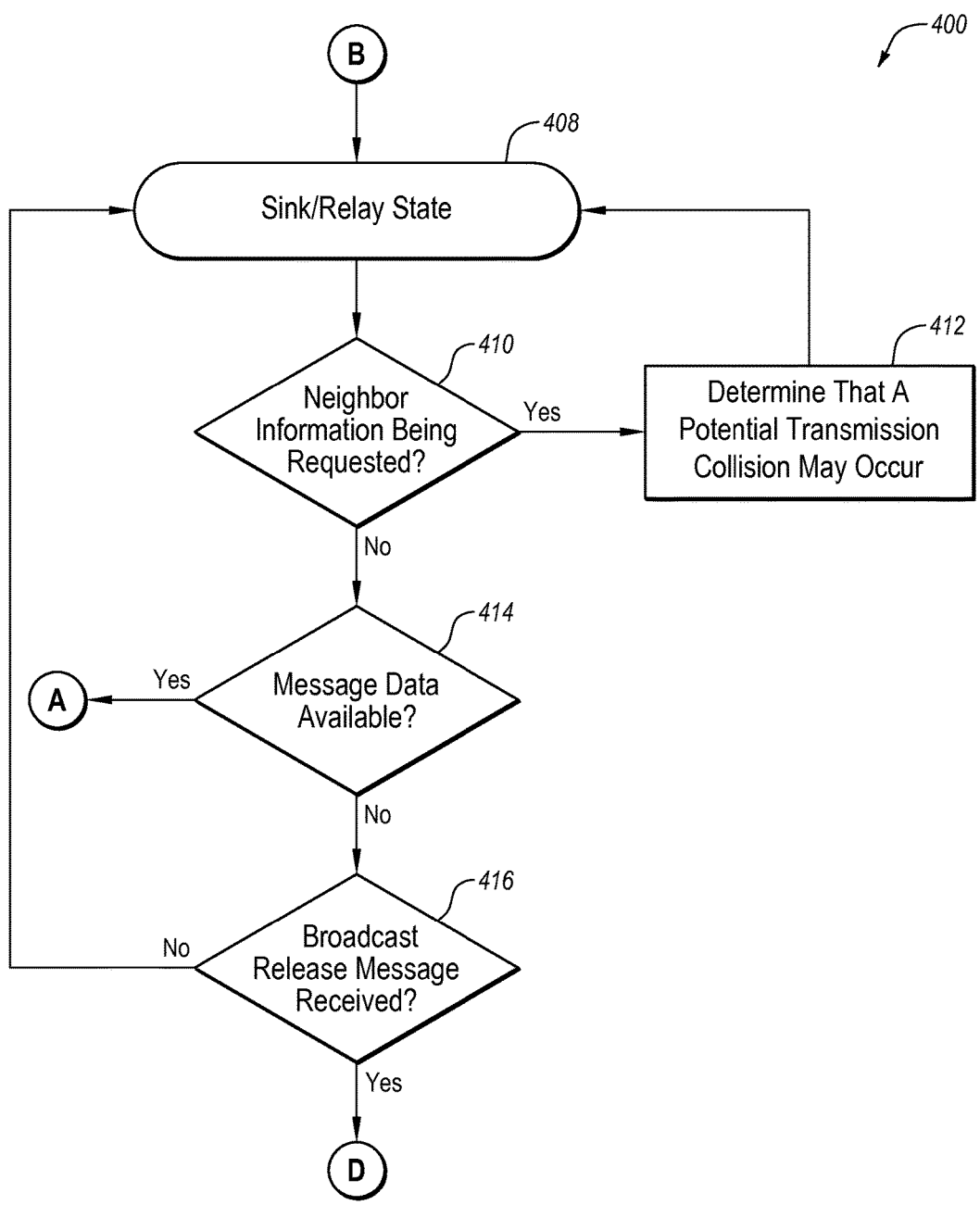
Figure 4C:
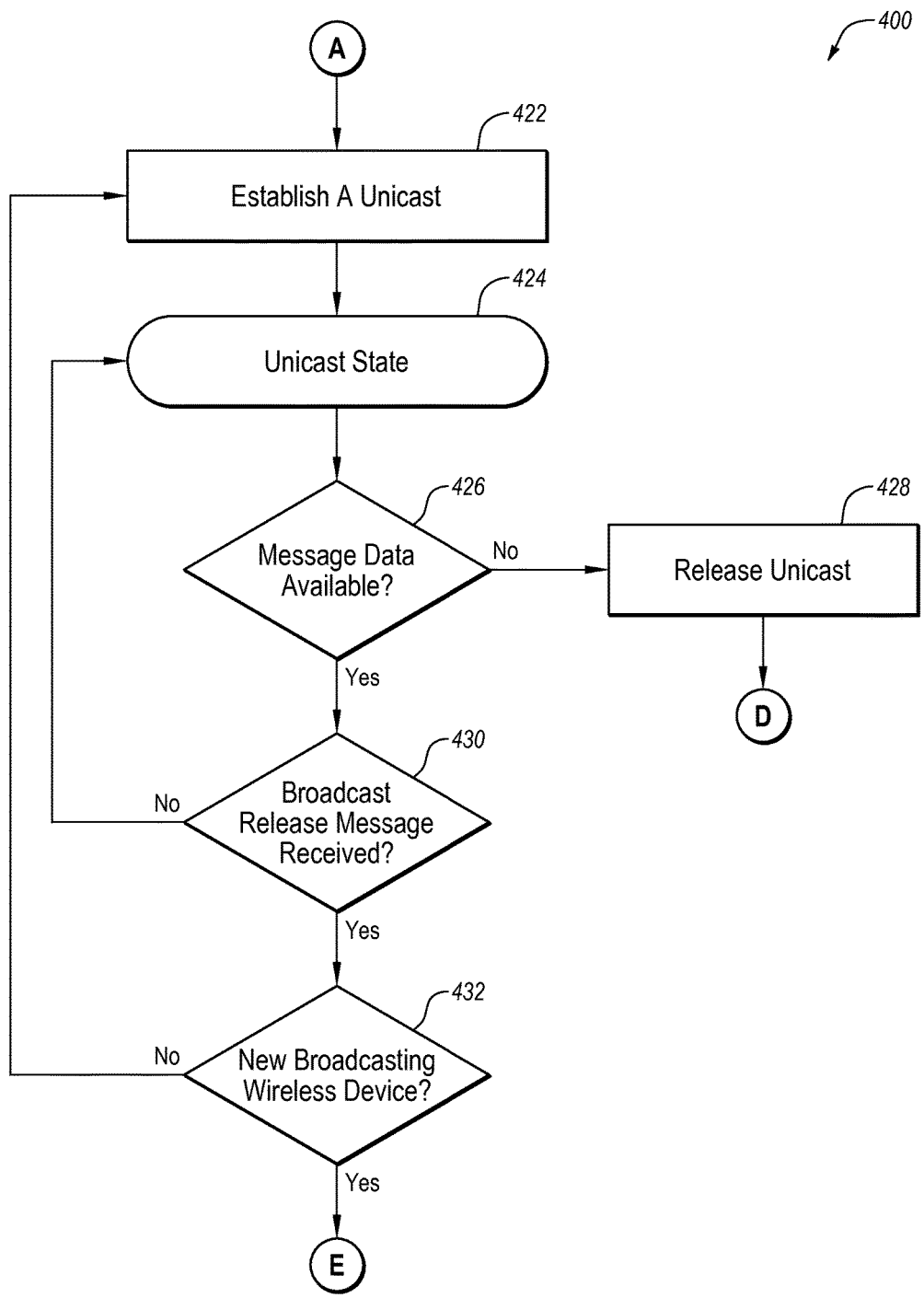
Figure 4D:
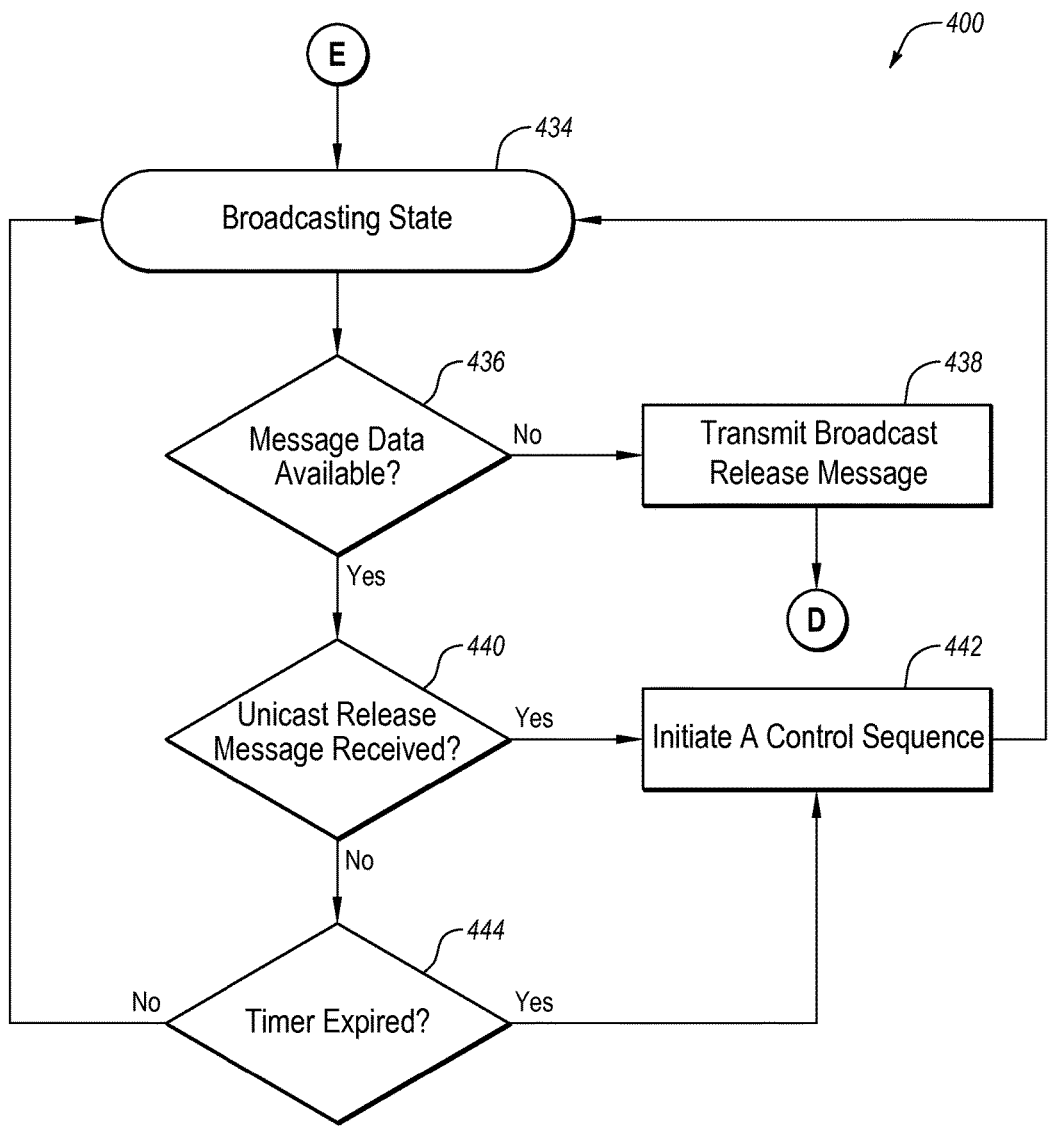

FIG. 3 illustrates an example wireless device 300 that may be used in a wireless communication network, in accordance with at least one embodiment described herein. The wireless device 300 may include a controller 310, a transceiver 320, an antenna 322, a memory 330, a codec 340, an aggregator 350, a data unit 360, a microphone 362, a speaker 364, and an interface 370.

The transceiver 320 may be configured to receive wireless D2D communications, such as packets, from other wireless devices and/or access points by way of the antenna 322. The transceiver 320 may also be configured to transmit wireless D2D communications, such as packets, to other wireless devices and/or access points by way of the antenna 322. The transceiver 320 may send received packets to the controller 310

The controller 310 may receive the received packets from the transceiver 320 and analyze the received packets to determine if the received packets have message data for presenting to a user of the wireless device 300. When the received packets have message data, the controller 310 may send the message data to the codec 340. Further details regarding the controller 310 are provided hereafter.

The interface 370 and the microphone 362 may be configured to receive input data from a user of the wireless device 300. For example, the interface 370 may be configured to receive messaging data or other data from a user of the wireless device 300 as the input data. The microphone 362 may be configured to receive voice data from a user of the wireless device 300 as the input data. The data unit 360 may be configured to receive the input data from the interface 370 and the microphone 362 and to generate message data based on the input data and send the message data to the aggregator 350.

The codec 340 may be configured to decode the message data from the controller 310 and provide the message data to the data unit 360. The data unit 360 may be further configured to provide message data from message data decoded by the codec 340 to a user of the wireless device 300 by way of the interface 370 and/or the speaker 364. For example, the data unit 360 may provide message data that includes voice data to the speaker 364 for presenting to the user. Alternately or additionally, the data unit 360 may provide message data that is messaging data to the interface 370 for presenting to the user. In some embodiments, the data unit 360 may determine when to present the message data to the user based on input from the controller 310.

The aggregator 350 may be configured to aggregate message data generated by the data unit 360 with message data from a received packet that is provided by the codec 340. The aggregator 350 may send the aggregated message data to the controller 310. Alternately, when there is no message data from a received packet, the aggregator 350 may provide the message data from the data unit 360 to the controller 310.

The controller 310 may be configured to receive packets from the transceiver 320 as indicated before and take action with respect to the packets. The action the controller 310 may take regarding a received packet may be determined based on the role of the wireless device 300, e.g., is the wireless device 300 a sink, a relaying, a broadcasting wireless device, or a unicasting wireless device. For example, the controller 310 may send the packet to the codec 340 so that message data in the packet may be presented to a user of the wireless device 300. Alternately or additionally, the controller 310 may generate packets with information as discussed herein. For example, the controller 310 may determine scheduling for packets transmitted by its neighboring wireless devices and include the information in the packet. The information may include neighboring wireless devices, message data, and unicast path data, among other information as discussed herein.

The controller 310 may be hardware that is configured to execute operations to cause the wireless device 300 to perform the operations described herein. In these and other embodiments, the hardware may execute operations by executing instructions stored in the memory 330. Alternately or additionally, the hardware may be an application specific integrated circuit (ASIC) or a field programmable gate array (FPGA) that is configured to execute operations to cause the wireless device 300 to perform the operations described herein. Alternately or additionally, the hardware may execute the operations using a combination of executions performed by ASIC/FPGA and executions performed by instructions stored in the memory 330. The memory 330 may be any computer-readable media as described herein. Modifications, additions, or omissions may be made to the wireless device 300 without departing from the scope of the present disclosure.

FIGS. 4A-4D is a flowchart of an example method 400 of device-to-device (D2D) communication by a wireless device in a wireless communication network, arranged in accordance with at least one embodiment of the present disclosure. The method 400 may be implemented, in some embodiments, by a wireless device, such as one of the wireless devices of FIGS. 1, 2A, and 2B or the controller 310 of FIG. 3. In particular, the method 400 may involve acts performed by a wireless device in a network with no access point supervision. Although illustrated as discrete blocks, various blocks may be divided into additional blocks, combined into fewer blocks, or eliminated, depending on the desired implementation.

The method 400 may begin at block 402 where a wireless device may transition to an idle state in a network. In some embodiments, the network may be a wireless communication network that is not controlled by an access point as described herein. In the idle state, the wireless device may have information about its neighboring wireless devices based on D2D discovery signals or some other mechanism. The wireless device may transition to the idle state when first joining the network, such as when the wireless device is powered on or when the wireless device moves from one location to another location within the network. Alternately or additionally, the wireless device may transition to the idle state after a broadcasting wireless device ends broadcasting and no other wireless device is broadcasting in the network.

In block 404, the wireless device may determine if message data is available at the wireless device for transmitting to other wireless devices in the network. Message data may be available when a user of the wireless device provides an input to the wireless device, such as voice input. When message data is available, the method 400 may proceed to block 418. When message data is not available, the method 400 may proceed to block 406.

In block 406, the wireless device may determine if the neighbor information is being requested from another wireless device. For example, the wireless device may receive a packet requesting that the wireless device transmit a list of one or more of its neighboring wireless devices to another wireless device. For example, during a control sequence the wireless device may receive a packet requesting information about its neighboring wireless devices. When neighbor information is being requested, the method 400 may proceed to block 408. When neighbor information is not being requested, the method 400 may proceed to block 402.

In block 408, the wireless device may transition into a sink/relay state. In the sink/relay state, the wireless device may receive packets with message data from other wireless devices but may not generate packets with message data. When the wireless device is a relaying wireless device, the wireless device may receive packets with message data, present the message data to a user of the wireless device, and retransmit the packets to other wireless devices. When the wireless device is a sink wireless device, the wireless device may present the message data to a user of the wireless device.

In block 410, the wireless device may determine if neighbor information is being requested from another wireless device. For example, the wireless device may receive a second packet requesting that the wireless device transmit a list of one or more of its neighboring wireless devices to another wireless device. For example, during a control sequence, the wireless device may receive a second packet requesting information about neighboring wireless devices. When neighbor information is being requested a second time, the method 400 may proceed to block 412. When neighbor information is not being requested, the method 400 may proceed to block 414.

In block 412, the wireless device may determine that a potential transmission collision may occur. Based on the potential transmission collision, the wireless device may reserve a radio resource for receiving packets with message data. The wireless device may indicate the reserved radio resource to the sender of the first request for neighbor information and to the sender of the second request for neighbor information. In these and other embodiments, the wireless device may send the reserved radio resource to the first and second requesters using the radio resources used by the second packet that requested the neighbor information for a second time.

In block 414, the wireless device may determine if message data is available at the wireless device for transmitting to other wireless devices in the network. When message data is available, the method 400 may proceed to block 422. When message data is not available, the method 400 may proceed to block 416.

In block 416, the wireless device may determine if a broadcast release message is received at the wireless device. The broadcast release message may be a message from a broadcasting wireless device that the broadcasting wireless device does not have more message data to broadcast. When the broadcast release message is received, the method 400 may proceed to block 402. When the broadcast release message is not received, the method 400 may proceed to block 408.

In block 418, it may be determined if the wireless device is a first broadcasting wireless device in the network. When the wireless device is the first broadcasting wireless device in the network, the method 400 may proceed to block 420. When the wireless device is not the first broadcasting wireless device in the network, the method 400 may proceed to block 422.

In block 420, the wireless device may initiate a control sequence as described herein. During the control sequence, the relaying and talking wireless devices may collect two-hop neighbor information from their neighboring wireless devices. Furthermore, wireless devices where potential transmission collisions may occur may be identified, radio resources may be reserved, and knowledge about the reserved radio resources may be distributed to reduce the transmission collisions.

In block 422, the wireless device may establish a unicast with the broadcasting wireless device. Establishing the unicast may involve the wireless device sending a unicast request to the broadcasting wireless device along a unicast path. The broadcasting wireless device reserving a radio resource for the unicast, informing the wireless device and the wireless devices along the unicast path of the reserved radio resources, and informing two-hop neighbors of the wireless devices along the unicast path and of the wireless device of the unicast and the reserved radio resource.

In block 424, the wireless device may transition to a unicast state. In the unicast state, the wireless device may generate message data based on user input and unicast the message data to a broadcasting wireless device so that the broadcasting wireless device may broadcast the message data to the wireless devices in the network.

In block 426, the wireless device may determine if message data continues to be available at the wireless device for transmitting to other wireless devices in the network. When message data is available, the method 400 may proceed to block 430. When message data is not available, the method 400 may proceed to block 428.

In block 428, the wireless device may release the unicast established with the broadcasting wireless device. When releasing the unicast, the wireless device may generate a unicast release message and distribute the unicast release message to the broadcasting wireless device and the other wireless devices along the unicast path. In some embodiments, the other wireless devices may inform their two-hop neighbors of the release such that reserved radio resources for the unicast may be used for other transmissions.

In block 430, the wireless device may determine if a broadcast release message is received at the wireless device. The broadcast release message may be a message from a broadcasting wireless device, that the broadcasting wireless device does not have more message data to broadcast. When the broadcast release message is received, the method 400 may proceed to block 432. When the broadcast release message is not received, the method 400 may proceed to block 424.

In block 432, the wireless device may determine if the wireless device is a new broadcasting wireless device. When there are no other wireless devices that are unicasting, the wireless device may be assigned as the next broadcasting wireless device. When there are more than two wireless devices unicasting, the previous broadcasting wireless device may assign one of the unicasting wireless devices as the broadcasting wireless device. Alternately or additionally, the unicasting wireless devices may determine amongst themselves which is the next broadcasting wireless device. When the wireless device is the new broadcasting wireless device, the method 400 may proceed to block 434. When the wireless device is not a new broadcasting wireless device, the method 400 may proceed to block 422.

In block 434, the wireless device may transition to a broadcasting state. In the broadcasting state, the wireless device may broadcast message data to others of the wireless devices in the network. In some embodiments, the wireless device in the broadcasting state may receive unicast packets from unicasting wireless devices and aggregate message data from the unicast packets with message data generated at the wireless device.

In block 436, the wireless device may determine if message data continues to be available at the wireless device for transmitting to other wireless devices in the network. When message data is available, the method 400 may proceed to block 440. When message data is not available, the method 400 may proceed to block 438.

In block 438, the wireless device may generate and transmit a broadcast release message to the other wireless devices of the network. The broadcast release message may indicate that the wireless device is not distributing message data in the network. The method 400 may proceed to block 402.

In block 440, the wireless device may determine if a unicast release message has been received from a unicasting wireless device. When a unicast release message has been received, the method 400 may proceed to block 442. When a unicast release message has not been received, the method 400 may proceed to block 444.

In block 442, the wireless device may initiate a control sequence as described herein. During the control sequence, the relaying and talking wireless devices may collect two-hop neighbor information from their neighboring wireless devices. Furthermore, wireless devices where potential transmission collisions may occur may be identified, radio resources may be reserved, and knowledge about the reserved radio resources may be distributed to reduce the transmission collisions. After the control sequence is finished, the method may proceed to block 434.

In block 444, the wireless device may determine if a timer has expired. The timer may be used to refresh information in the network because the wireless devices are not static and may be moving. The timer may be set for a particular duration of time. The duration of time may be based on a configuration of the network, the landscape of the network, among other variables. When the timer has expired, the method 400 may proceed to block 442. When the timer has not expired, the method 400 may proceed to block 434.

One skilled in the art will appreciate that, for method 400 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
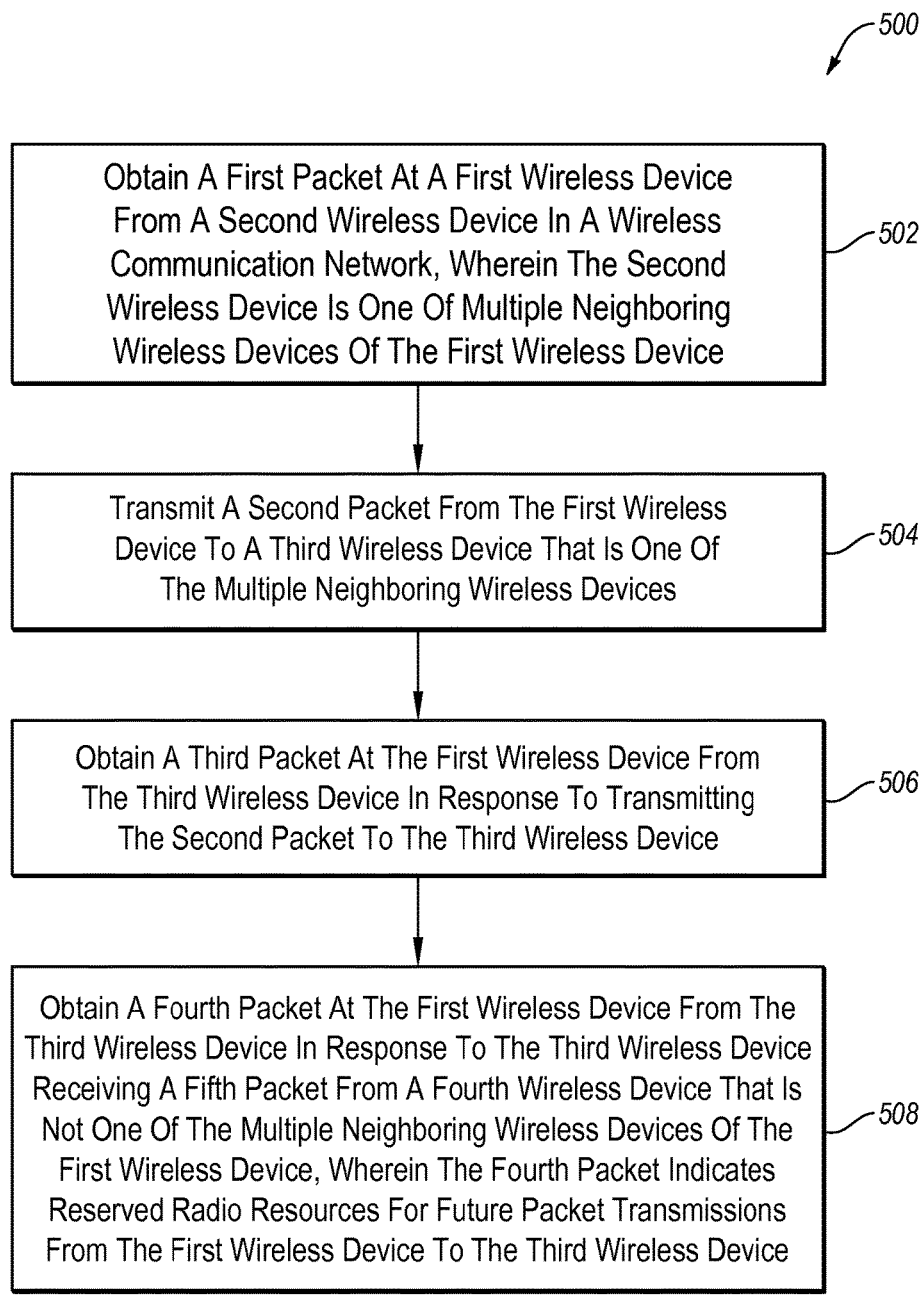
FIG. 5 is a flowchart of an example method of device-to-device communication by a wireless device in a wireless communication network.

FIG. 5 is a flowchart of an example method 500 of device-to-device communication by a wireless device in a wireless communication network, arranged in accordance with at least one embodiment of the present disclosure. The method 500 may be implemented, in some embodiments, by a wireless device, such as one of the wireless devices of FIGS. 1, 2A, and 2B or the controller 310 of FIG. 3. Although illustrated as discrete blocks, various blocks may be divided into additional blocks, combined into fewer blocks, or eliminated, depending on the desired implementation.

The method 500 may begin at block 502 where a first packet at a first wireless device may be obtained from a second wireless device in a wireless communication network. The second wireless device may be one of a multiple neighboring wireless devices of the first wireless device. In some embodiments, the first packet may direct the first wireless device to request neighboring wireless device information from one or more of the multiple neighboring wireless devices of the first wireless device.

At block 504, a second packet may be transmitted from the first wireless device to a third wireless device that is one of the multiple neighboring wireless devices of the first wireless device.

At block 506, a third packet may be obtained at the first wireless device from the third wireless device in response to transmitting the second packet to the third wireless device.

At block 508, a fourth packet may be obtained at the first wireless device from the third wireless device in response to the third wireless device receiving a fifth packet from a fourth wireless device that is not one of the multiple neighboring wireless devices of the first wireless device. The fourth packet may indicate reserved radio resources for future packet transmissions from the first wireless device to the third wireless device.

One skilled in the art will appreciate that, for method 500 and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, in response to obtaining the fourth packet, the method 500 may further include transmitting a sixth packet to the second wireless device that indicates the reserved radio resources for the future packet transmitted from the first wireless device to the third wireless device. In some embodiments, the first packet may be transmitted using first radio resources from the first group of radio resources and the second packet may be transmitted using second radio resources from a second group of radio resources that is included in the first group of radio resources. In these and other embodiments, the fourth packet and the sixth packet may be transmitted using third radio resources that are not included in the first group of radio resources.

The method 500 may further include receiving a sixth packet from the second wireless device. In these and other embodiments, the sixth packet may include message data generated by a user of the wireless communication network and may direct the first wireless device to transmit the message data to the third wireless device using the reserved radio resources. In some embodiments, the sixth packet may further direct the first wireless device to transmit the message data to a fifth wireless device using a particular group of resources for transmissions to the fifth wireless device. In these and other embodiments, the fifth wireless device may be one of the multiple neighboring wireless devices of the first wireless device. The method 500 may further include determining radio resources for transmitting the message data based on a time for the transmission and the particular group of resources.

The method 500 may further include obtaining a sixth packet at the first wireless device for establishing a unicast link between wireless devices in the wireless communication network. The sixth packet may include second reserved radio resources for future unicast transmissions. The method 500 may further include transmitting a seventh packet from the first wireless device to one or more of the multiple neighboring wireless devices. The seventh packet may indicate the second reserved radio resources for future unicast transmissions.

Embodiments described herein, may be implemented using computer-readable media for carrying or having computer-executable instructions or data structures stored thereon. Such computer-readable media may be any available media that may be accessed by a general purpose or special purpose computer (e.g., a processor). By way of example, and not limitation, such computer-readable media may include a non-transitory or tangible computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions include, for example, instructions and data that cause a general-purpose computer, special purpose computer, or special purpose-processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modules running on a computing system.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. Hardware configured to execute operations to cause a wireless device in a wireless communication network system to perform operations for device-to-device communication, the operations comprising:

obtaining a first packet at a first wireless device from a second wireless device in a wireless communication network, wherein the second wireless device is one of a plurality of neighboring wireless devices of the first wireless device;

transmitting a second packet from the first wireless device to a third wireless device that is one of the plurality of neighboring wireless devices, wherein the second packet includes a request for information regarding neighbors of the third wireless device;

obtaining a third packet at the first wireless device from the third wireless device in response to transmitting the second packet to the third wireless device, wherein the third packet includes information regarding neighbors of the third wireless device as a response to the request included in the second packet; and obtaining a fourth packet at the first wireless device from the third wireless device in response to the third wireless device receiving a fifth packet from a fourth wireless device that is not one of the plurality of neighboring wireless devices of the first wireless device, wherein the fourth packet indicates reserved radio resources for future packet transmissions from the first wireless device to the third wireless device.

2. The hardware of claim 1, wherein the operations further comprise, in response to obtaining the fourth packet, transmitting a sixth packet to the second wireless device that indicates the reserved radio resources for the future packet transmitted from the first wireless device to the third wireless device.

3. The hardware of claim 2, wherein the first packet is transmitted using first radio resources from the first group of radio resources, the second packet is transmitted using second radio resources from a second group of radio resources that is included in the first group of radio resources, and the fourth packet and the sixth packet are transmitted using third radio resources that are not included in the first group of radio resources.

4. The hardware of claim 2, wherein the operations further comprise obtaining a seventh packet from the second wireless device at the first wireless device, wherein the seventh packet includes message data generated by a user of the wireless communication network and directs the first wireless device to transmit the message data to the third wireless device using the reserved radio resources.

5. The hardware of claim 4, wherein the seventh packet further directs the first wireless device to transmit the message data to a fifth wireless device, which is one of the plurality of neighboring wireless devices of the first wireless device, using a particular group of resources for transmissions to the fifth wireless device.

6. The hardware of claim 5, wherein the operations further comprise determining radio resources for transmitting the message data based on a time for the transmission and the particular group of resources.

7. The hardware of claim 1, wherein the first packet directs the first wireless device to request neighboring wireless device information from one or more of the plurality of neighboring wireless devices of the first wireless device.

8. The hardware of claim 1, wherein the reserved radio resources are first reserved radio resources and the operations further comprise:
   obtaining a sixth packet at the first wireless device for establishing a unicast link between wireless devices in the wireless communication network, wherein the sixth packet includes second reserved radio resources for future unicast transmissions; and
   transmitting a seventh packet from the first wireless device to one or more of the plurality of neighboring wireless devices, wherein the seventh packet indicates the second reserved radio resources for future unicast transmissions.

9. A method comprising:
   obtaining a first packet at a first wireless device from a second wireless device in a wireless communication network, wherein the second wireless device is one of a plurality of neighboring wireless devices of the first wireless device;
   transmitting a second packet from the first wireless device to a third wireless device that is one of the plurality of neighboring wireless devices, wherein the second packet includes a request for information regarding neighbors of the third wireless device;
   obtaining a third packet at the first wireless device from the third wireless device in response to transmitting the second packet to the third wireless device, wherein the third packet includes information regarding neighbors of the third wireless device as a response to the request included in the second packet; and
   obtaining a fourth packet at the first wireless device from the third wireless device in response to the third wireless device receiving a fifth packet from a fourth wireless device that is not one of the plurality of neighboring wireless devices of the first wireless device, wherein the fourth packet indicates reserved radio resources for future packet transmissions from the first wireless device to the third wireless device.

10. The method of claim 9, further comprising in response to obtaining the fourth packet, transmitting a sixth packet to the second wireless device that indicates the reserved radio resources for the future packet transmitted from the first wireless device to the third wireless device.

11. The method of claim 10, wherein the first packet is transmitted using first radio resources from the first group of radio resources, the second packet is transmitted using second radio resources from a second group of radio resources that is included in the first group of radio resources, and the fourth packet and the sixth packet are transmitted using third radio resources that are not included in the first group of radio resources.

12. The method of claim 10, further comprising obtaining a seventh packet from the second wireless device at the first wireless device, wherein the seventh packet includes message data generated by a user of the wireless communication network and directs the first wireless device to transmit the message data to the third wireless device using the reserved radio resources.

13. The method of claim 12, wherein the seventh packet further directs the first wireless device to transmit the message data to a fifth wireless device, which is one of the plurality of neighboring wireless devices of the first wireless device, using a particular group of resources for transmissions to the fifth wireless device.

14. The method of claim 13, further comprising determining radio resources for transmitting the message data based on a time for the transmission and the particular group of resources.

15. The method of claim 9, wherein the first packet directs the first wireless device to request neighboring wireless device information from one or more of the plurality of neighboring wireless devices of the first wireless device.

16. The method of claim 9, wherein the reserved radio resources are first reserved radio resources and the method further comprises:
   obtaining a sixth packet at the first wireless device for establishing a unicast link between wireless devices in the wireless communication network, wherein the sixth packet includes second reserved radio resources for future unicast transmissions; and
   transmitting a seventh packet from the first wireless device to one or more of the plurality of neighboring wireless devices, wherein the seventh packet indicates the second reserved radio resources for future unicast transmissions.

17. A non-transitory computer-readable medium having encoded therein programming code executable by a processor to perform operations comprising:
   obtaining a first packet at a first wireless device from a second wireless device in a wireless communication network, wherein the second wireless device is one of a plurality of neighboring wireless devices of the first wireless device;
   transmitting a second packet from the first wireless device to a third wireless device that is one of the plurality of neighboring wireless devices, wherein the second packet includes a request for information regarding neighbors of the third wireless device;
   obtaining a third packet at the first wireless device from the third wireless device in response to transmitting the second packet to the third wireless device, wherein the third packet includes information regarding neighbors of the third wireless device as a response to the request included in the second packet; and obtaining a fourth packet at the first wireless device from the third wireless device in response to the third wireless device receiving a fifth packet from a fourth wireless device that is not one of the plurality of neighboring wireless devices of the first wireless device, wherein the fourth packet indicates reserved radio resources for future packet transmissions from the first wireless device to the third wireless device.

18. The non-transitory computer-readable medium of claim 17, wherein the operations further comprise in response to obtaining the fourth packet, transmitting a sixth packet to the second wireless device that indicates the reserved radio resources for the future packet transmitted from the first wireless device to the third wireless device.

19. The non-transitory computer-readable medium of claim 18, wherein the first packet is transmitted using first radio resources from the first group of radio resources, the second packet is transmitted using second radio resources from a second group of radio resources that is included in the first group of radio resources, and the fourth packet and the sixth packet are transmitted using third radio resources that are not included in the first group of radio resources.

20. The non-transitory computer-readable medium of claim 17, wherein the reserved radio resources are first reserved radio resources and the operations further comprise:

obtaining a sixth packet at the first wireless device for establishing a unicast link between wireless devices in the wireless communication network, wherein the sixth packet includes second reserved radio resources for future unicast transmissions; and transmitting a seventh packet from the first wireless device to one or more of the plurality of neighboring wireless devices, wherein the seventh packet indicates the second reserved radio resources for future unicast transmissions.

* * * * *